US008478724B2

(12) United States Patent
Miyazaki et al.

(10) Patent No.: US 8,478,724 B2
(45) Date of Patent: Jul. 2, 2013

(54) INFORMATION LIFE CYCLE MANAGEMENT SYSTEM, INFORMATION MANAGEMENT SERVER APPARATUS, INFORMATION MEDIA CONTROLLING APPARATUS AND PROGRAM

(75) Inventors: Shingo Miyazaki, Fuchu (JP); Akito Niwa, Mitaka (JP); Tomoaki Morijiri, Chofu (JP); Kazuya Hashimoto, Fuchu (JP); Minako Ogawa, Fuchu (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 0 days.

(21) Appl. No.: 13/167,860

(22) Filed: Jun. 24, 2011

(65) Prior Publication Data

US 2011/0307446 A1 Dec. 15, 2011

Related U.S. Application Data

(63) Continuation of application No. PCT/JP2009/071345, filed on Dec. 22, 2009.

(30) Foreign Application Priority Data

Dec. 26, 2008 (JP) .................................. 2008-333595

(51) Int. Cl.
*G06F 17/00* (2006.01)
*G06F 17/30* (2006.01)

(52) U.S. Cl.
CPC ................................ *G06F 17/30017* (2013.01)
USPC ............................ 707/634; 707/769; 707/812

(58) Field of Classification Search
USPC ................ 707/634, 762, 794, 803, 809, 812, 707/636, 769, 770, 792, 802
See application file for complete search history.

(56) References Cited

U.S. PATENT DOCUMENTS

| 5,897,643 | A | 4/1999 | Matsumoto | |
|---|---|---|---|---|
| 8,195,713 | B2 * | 6/2012 | Miyazaki et al. | 707/803 |
| 2005/0144308 | A1 | 6/2005 | Harashima et al. | |
| 2010/0318581 | A1 * | 12/2010 | Miyazaki et al. | 707/803 |

FOREIGN PATENT DOCUMENTS

| JP | 8-190516 | 7/1996 |
|---|---|---|
| JP | 8-265361 | 10/1996 |
| JP | 8-292961 | 11/1996 |
| JP | 11-259459 | 9/1999 |
| JP | 2005-189995 A | 7/2005 |
| JP | 2005-190365 A | 7/2005 |
| JP | 2007-88796 A | 4/2007 |
| JP | 2008-27776 | 2/2008 |

OTHER PUBLICATIONS

Sile Yu et al., An improved structure of pre-determined parental viewing control data in software design for ATSC receiver, 2002, IEEE, 131-134.*
International Search Report issed Feb. 2, 2010 in PCT/JP2009/071345, filed Dec. 22, 2009.
International Written Opinion issed Feb. 2, 2010 in PCT/JP2009/071345, filed Dec. 22, 2009.

* cited by examiner

*Primary Examiner* — Jean B Fleurantin
(74) *Attorney, Agent, or Firm* — Oblon, Spivak, McClelland, Maier & Neustadt, L.L.P.

(57) ABSTRACT

According to one embodiment, even when the information media controlling apparatus which requests replication registration of electronic data and the information media controlling apparatus which acquires a child management file generated by replication registration are separate apparatuses, the information management server apparatus registers a child management ID of electronic data and a post office box ID of the acquisition destination of a child management file, in the post office box management table based on replication registration request information received from one information media controlling apparatus, and has the other information media controlling apparatus which is the acquisition destination acquire the child management file based on the post office box management table.

5 Claims, 32 Drawing Sheets

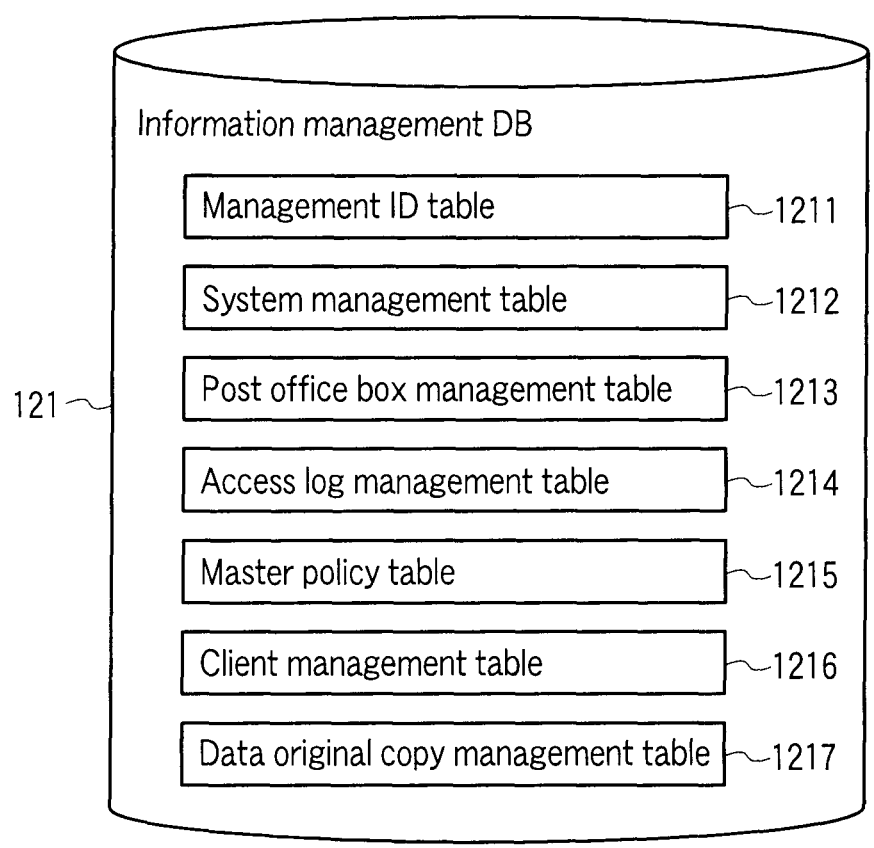
F I G. 4

F I G. 5

Management ID table 1211

| Management ID | Issue date | Issue request source information | Expiration date | Expiration request source information |
|---|---|---|---|---|
| 1000101 | yyyy/mm/dd | Device A (ip:10.xxx.xx.x) | – | Device A (ip:10.xxx.xx.x) |
| 1001101 | yyyy/mm/dd | Device A (ip:10.xxx.xx.x) | – | Device A (ip:10.xxx.xx.x) |
| 1001102 | yyyy/mm/dd | Device A (ip:10.xxx.xx.x) | – | Device A (ip:10.xxx.xx.x) |
| 1001201 | yyyy/mm/dd | Device A (ip:10.xxx.xx.x) | – | Device A (ip:10.xxx.xx.x) |
| 1001301 | yyyy/mm/dd | Device A (ip:10.xxx.xx.x) | – | Device A (ip:10.xxx.xx.x) |
| 1002101 | yyyy/mm/dd | MFP X (ip:10.xxx.xx.x) | yyyy/mm/dd | MFP X (ip:10.xxx.xx.x) |

Post office box management table 1213

| Post office box ID | Number of postings | Management ID list |
|---|---|---|
| 1000001 | 0 | null |
| 1000002 | 0 | null |
| 1000003 | 2 | #10001111(Posting date:2008/05/02)<br>#10002111(Posting date:2008/06/12) |
| 1000004 | 1 | #10002112(Posting date:2008/06/12) |
| 1000005 | 0 | null |
| 1000007 | 1 | #10002113(Posting date:2008/06/12) |

F I G. 7

Access log management table 1214

| Date | Client ID | Operation type | Management ID | Processing status |
|---|---|---|---|---|
| 2008/04/12 10:22 | 101 | New registration | 1000101 | Succeed |
| 2008/04/22 11:23 | 232 | Post office box check | – | Succeed |
| 2008/04/22 16:03 | 001 | Replication acquisition | 1000102 | Succeed |
| ... | | | | ... |
| 2008/09/27 15:32 | 931 | Replication registration | – | Authorization error |
| 2008/09/27 15:41 | 543 | Post office box check | – | Succeed |

F I G. 8

Master policy table 1215

| Policy number | Policy type | Rejection/permission policy |
|---|---|---|
| 001 | Location control | IP address is "172.xx.xxx.xxx _ inside wired connection", all commands are permitted |
| 002 | Location control | IP address is "10.xxx.xxx.xxx _ inside wireless connection", only replication acquisition is permitted |
| 003 | Location control | "172.xx.xxx.xxx _ inside wired connection", all commands are permitted |
| 004 | Time control | When command receiving time is 02:00 – 06:00, all commands are rejected |
| 005 | Permission control | When user attribute is not senior person, information discard command is rejected |
| ... | ... | ... |

Client management table (1216)

| Client ID | Employee number | Authority class | Terminal type | MAC address |
|---|---|---|---|---|
| 0001 | 020001 | Senior person | Desktop PC | XXXXXXXX |
| 0002 | 020005 | Senior person | Desktop PC | XXXXXXXX |
| 0003 | 020019 | Regular employee | Office mobile telephone | XXXXXXXX |
| ... | ... | ... | ... | ... |
| 8999 | 080382 | Administrator | Notebook PC | XXXXXXXX |
| 9000 | 080398 | Regular employee | Desktop PC | XXXXXXXX |

FIG. 11

Data original copy management table (1217)

| Entity ID | Data original copy identification ID |
|---|---|
| File name | File name of management target data main body stored in management file |
| Size | File size of management target data main body stored in management file |
| Hash value | Hash value of management target data main body stored in management file |
| Electronic data main body | Management target data main body stored in management file (when stored in information management DB) |
| External storage information | Storage destination information of management target data when management target data main body is separated and stored outside information management DB |

Management client DB — 217

Management file management table — 2171

| Management ID | Status | Management file header partial information | Management file entity |
|---|---|---|---|
| 1000101 | During viewing | alive (2008/04/22~) | 1000101.ilc |
| 1001101 | - | dead (2008/06/12~2008/09/17) | - |
| 1010101 | Available | alive (2008/05/10~) | 1001102.ilc |
| 1020101 | Available | alive (2008/06/11~) | 1001201.ilc |
| 1030101 | - | dead (2008/07/30~2008/09/27) | - |

Access log table — 2172

| Date | | Operation type | Management ID | Management file name |
|---|---|---|---|---|
| 2008/04/22 | 10:22 | Login | - | - |
| 2008/04/22 | 11:23 | New registration | 1000101 | - |
| 2008/04/22 | 13:00 | Replication registration | 1001101 | - |
| 2008/04/22 | 16:03 | Post office box check | - | - |
| 2008/04/22 | 16:10 | Replication acquisition | 1001101 | 1001101.ilc |
| 2008/09/27 | 15:32 | Viewing | 1030101 | 1030101.ilc |
| 2008/09/27 | 15:41 | Delete | 1030101 | 1030101.ilc |

FIG. 12

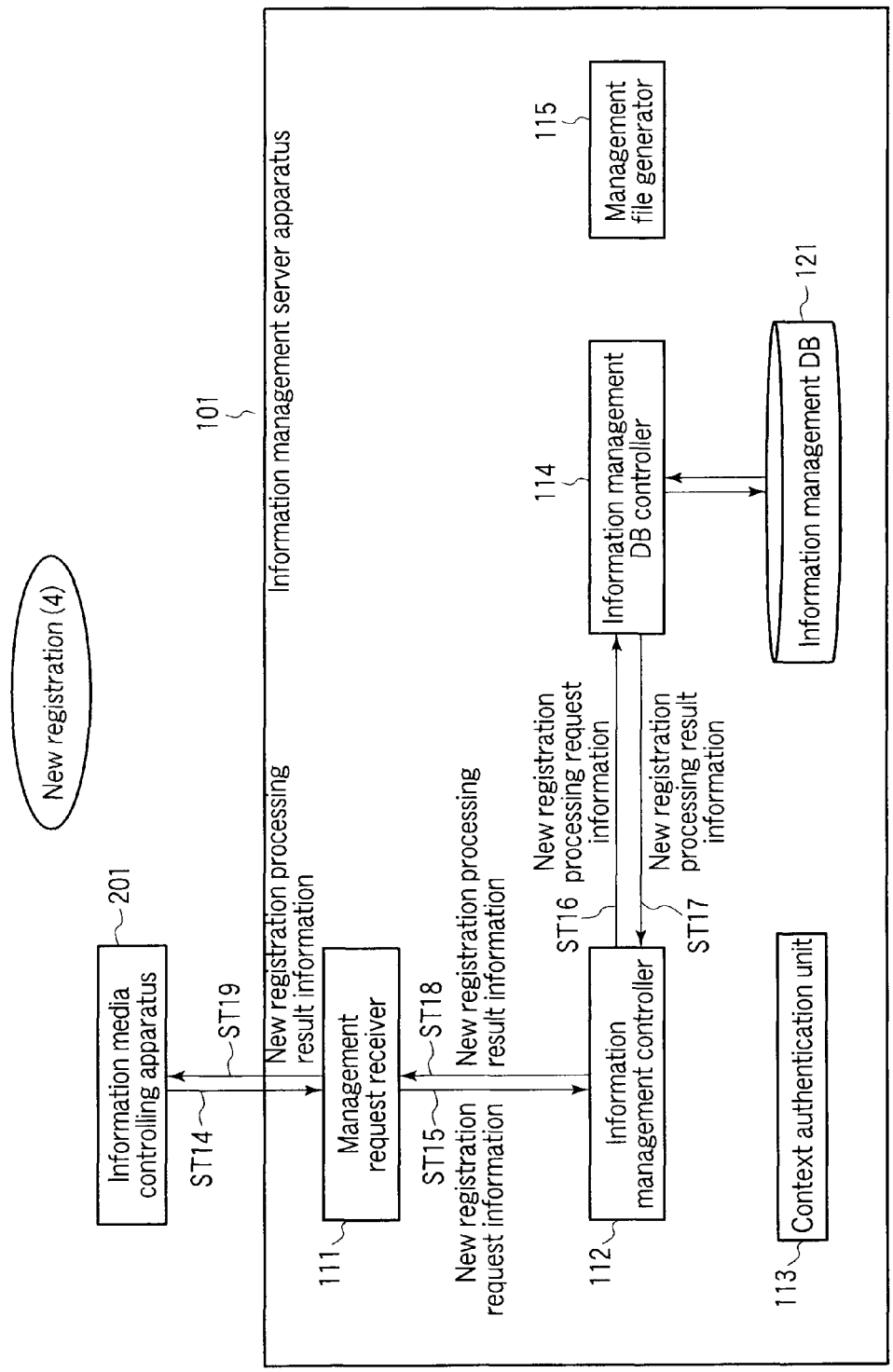
F I G. 16

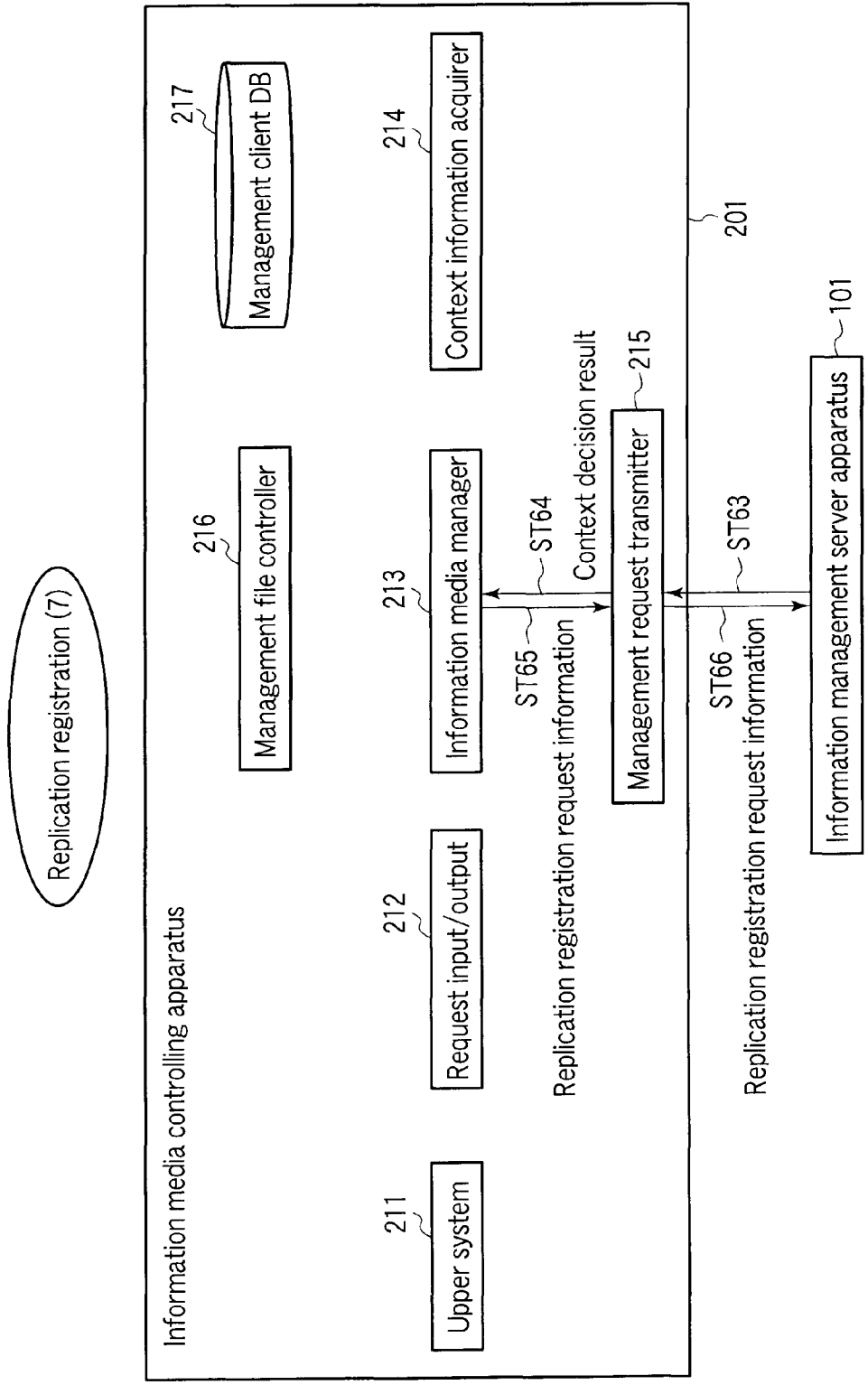
F I G. 24

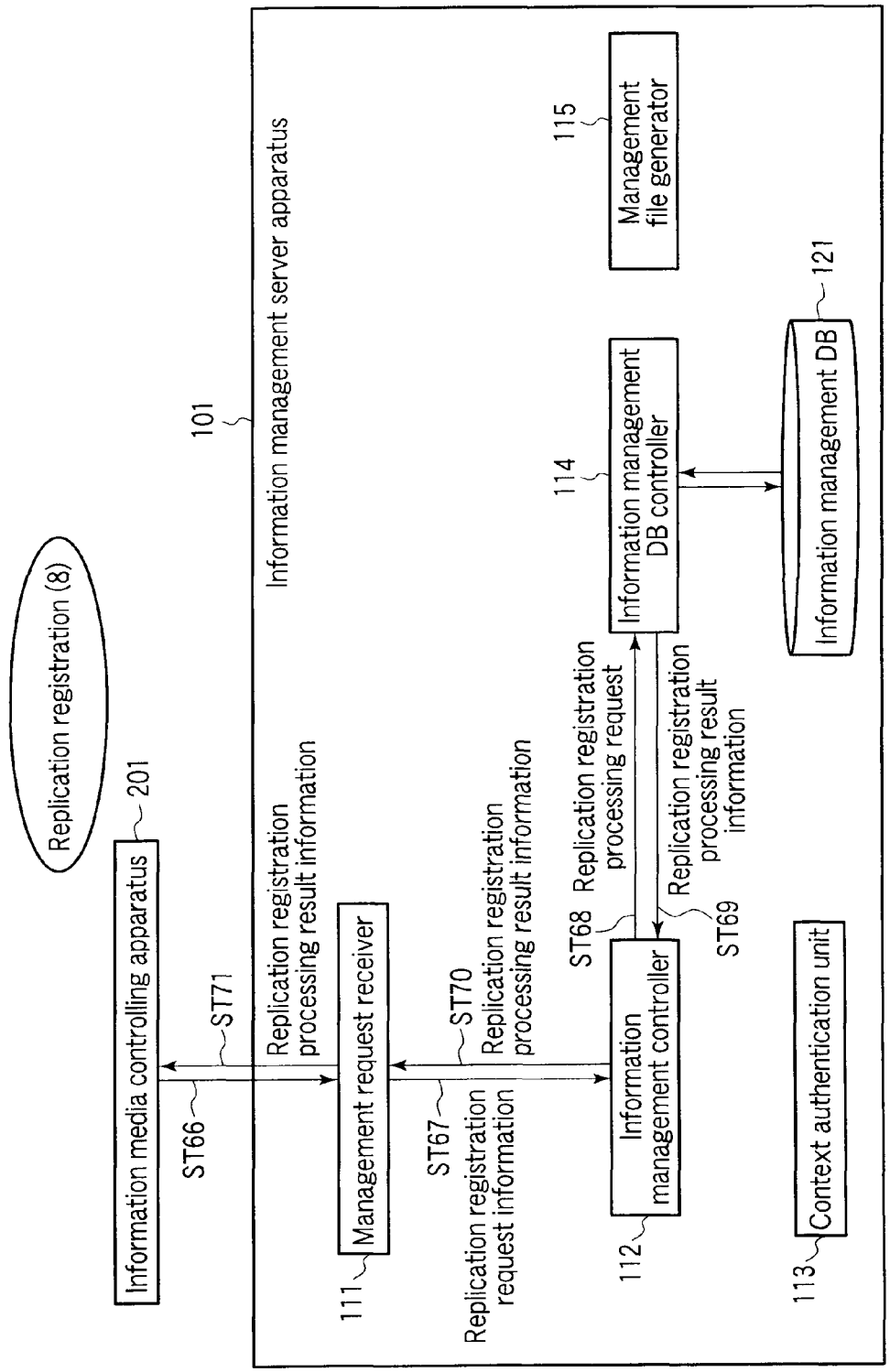
F I G. 25

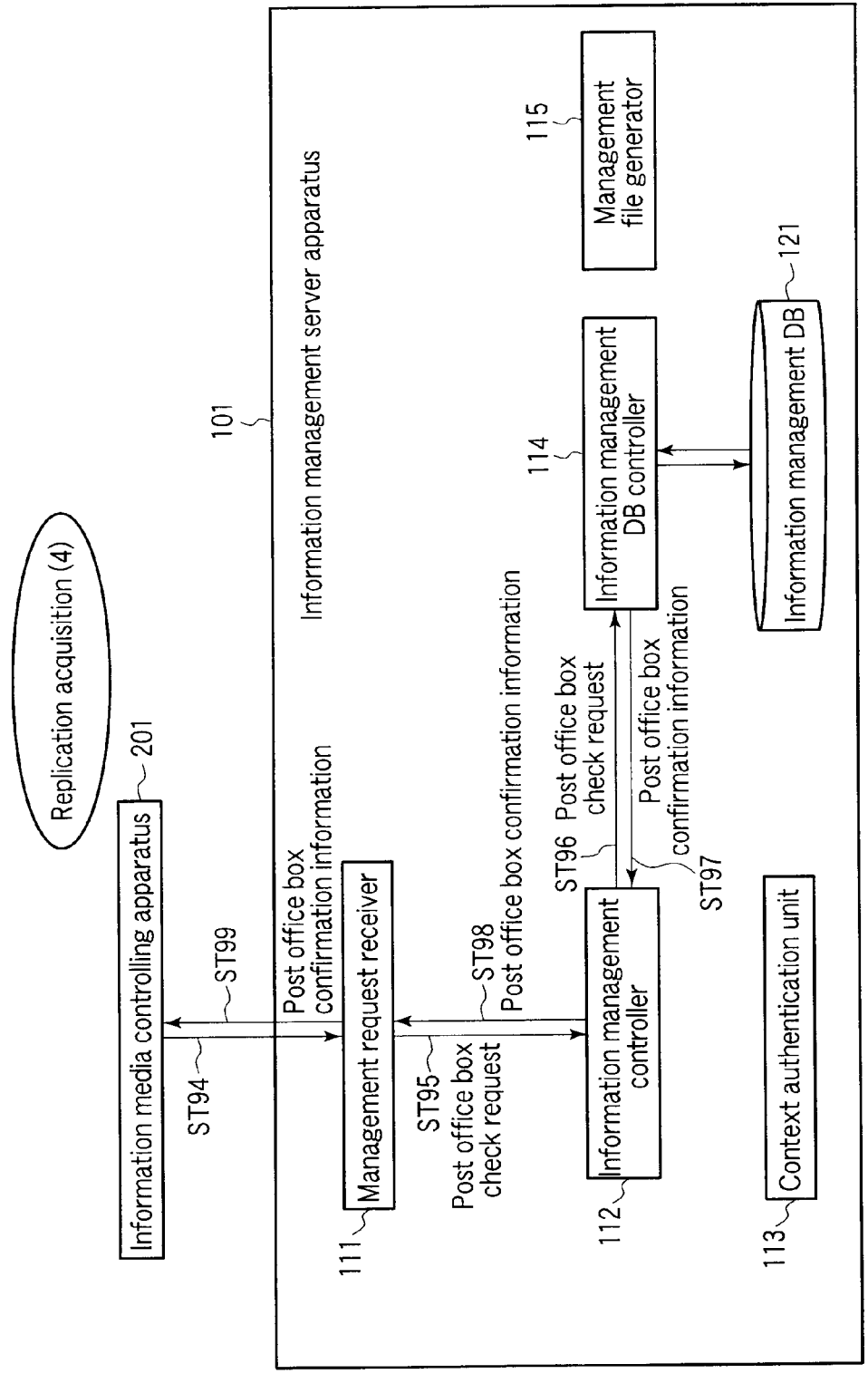
F I G. 30

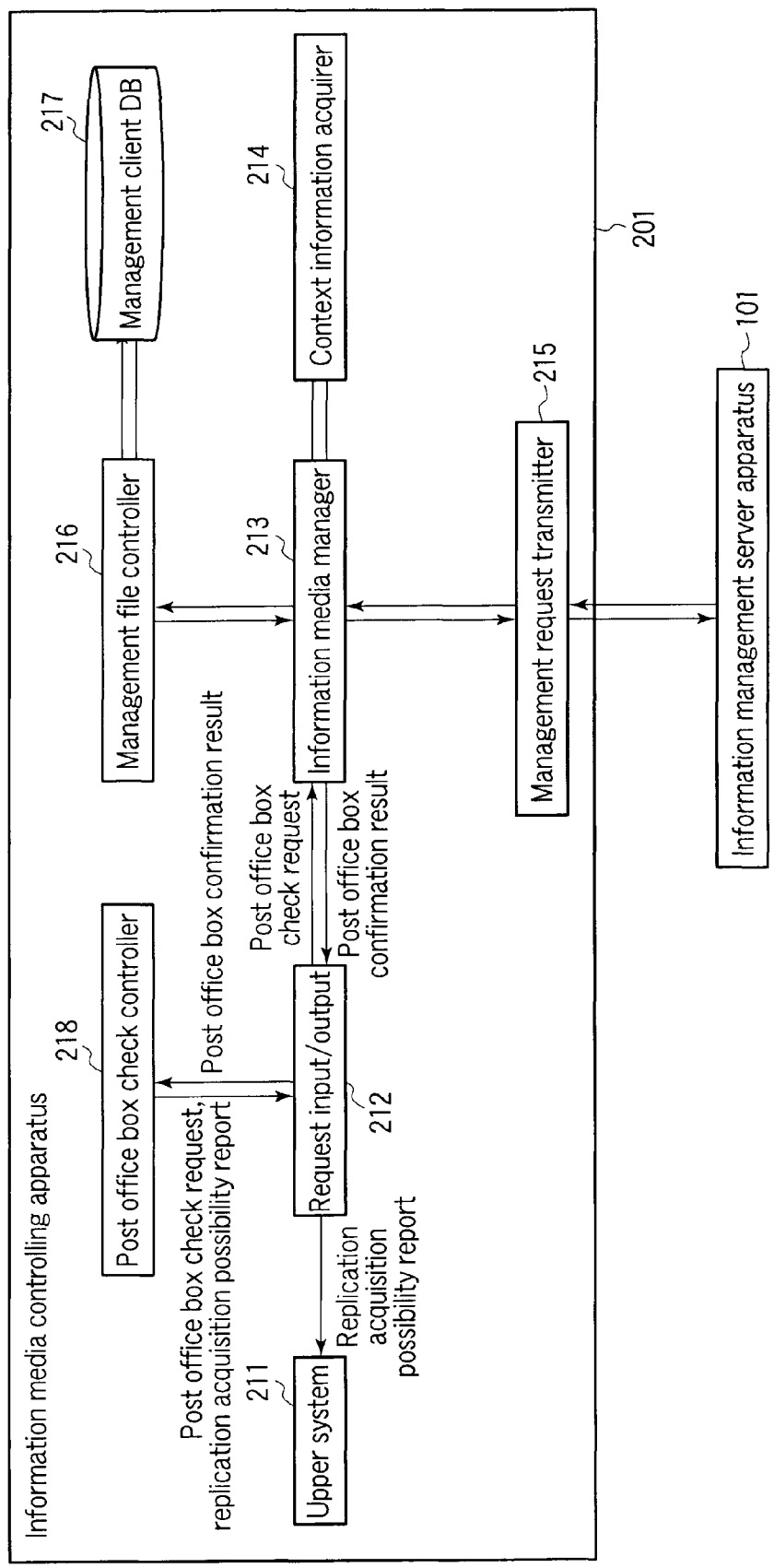
F I G. 34

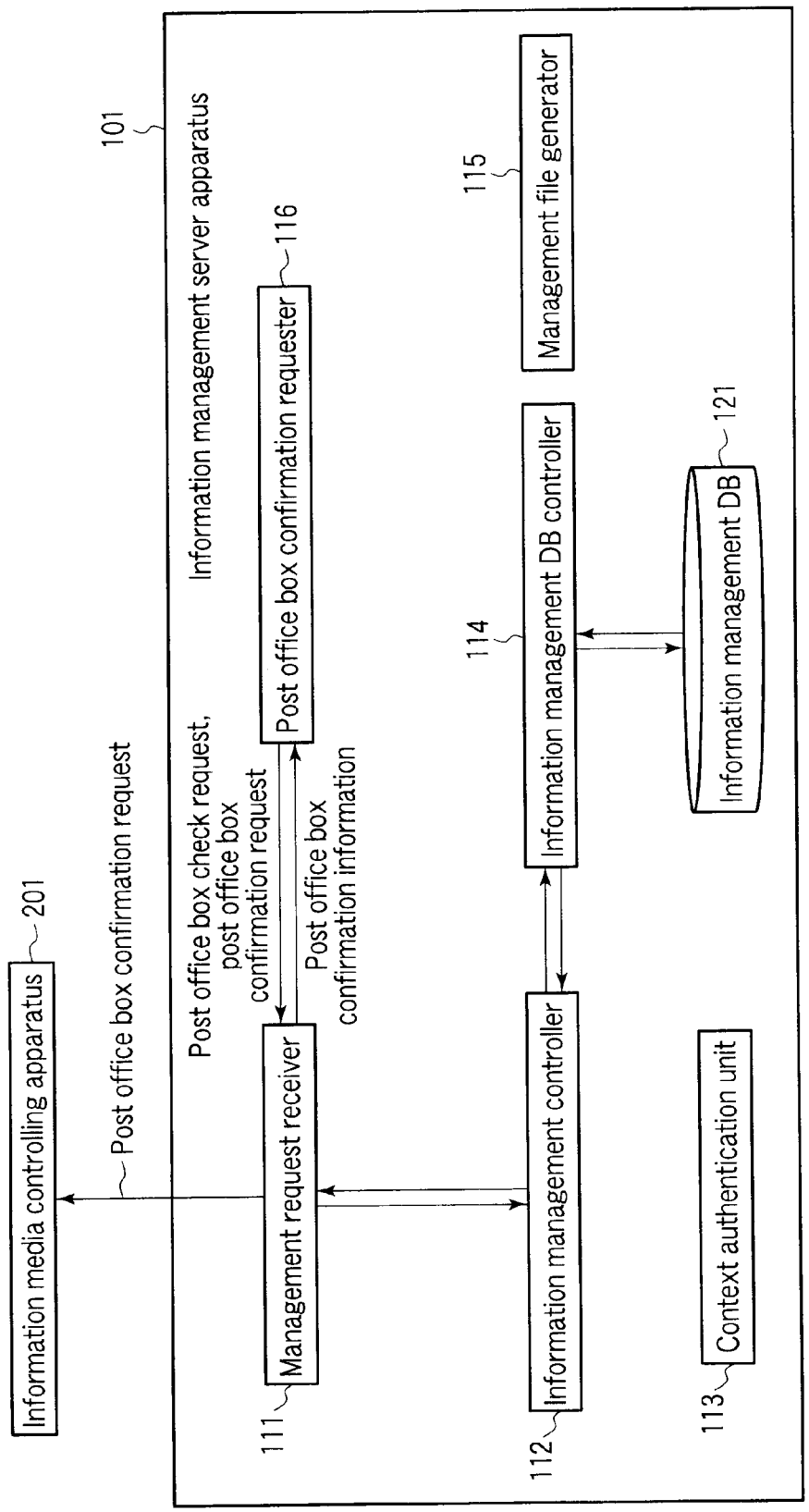
F I G. 35

INFORMATION LIFE CYCLE MANAGEMENT SYSTEM, INFORMATION MANAGEMENT SERVER APPARATUS, INFORMATION MEDIA CONTROLLING APPARATUS AND PROGRAM

CROSS REFERENCE TO RELATED APPLICATIONS

This is a Continuation Application of PCT Application No. PCT/JP2009/071345, filed Dec. 22, 2009, which was published under PCT Article 21(2) in Japanese, and which is based upon and claims the benefit of priority from prior Japanese Patent Application No. 2008-333595, filed Dec. 26, 2008, the entire contents of both of which are incorporated herein by reference.

BACKGROUND OF THE INVENTION

1. Field of the Invention

The present invention relates to an information life cycle management system, an information management server apparatus, an information media controlling apparatus and a program which can prevent an occurrence of a period in which an information life cycle of a child management file cannot be managed.

2. Description of the Related Art

A technique is proposed which manages an information life cycle of single document data. As techniques of this kind, a system (see, for example, Jpn. Pat. Appln. KOKAI Publication No. 2005-190365) which manages, in a server, a history from printing to discard of a paper document assigned an ID (identification), a system (see, for example, Jpn. Pat. Appln. KOKAI Publication No. 2007-88796) which manages document disposal information such as retrieval or discard by assigning an identifier to print image data, and the like are known.

Further, the inventors of the present invention propose an information life cycle management technique in Japanese Patent Application No. 2008-27776 of a prior application which was not published upon filing of this basic application of the present application. According to this information life cycle management technique, by assigning to an information original copy and information media a unique ID for individual identification of "media containing information" (hereinafter, "information media") such as digital data or physical media, the status related to creation/discard of information media, an interrelationship (system or media type) and media use is connected with an information original copy and uniformly and systematically managed. In addition, the physical media are a generic concept including paper, CDROM, DVD, SD card and FD, and are physical information media which are not related to a method containing information.

BRIEF SUMMARY OF THE INVENTION

However, although the above information life cycle management techniques do not have problems in general use, these techniques can be improved in the following respect according to the study of the inventors of the present invention.

First, according to the proposed information life cycle management technique, parent management data of a replication target needs to exist on the client (information media controlling apparatus) side which requests replication of a management file, and a management server (information management server apparatus) outputs a replicated child management file to this requesting client.

To pass this child management file to another client, this requesting client sends the child management file to another client through a system which is not under control of an information life cycle management system (uniform systematic management system) by means of, for example, an electronic mail, shared folder or portable storage.

The other client sends to the management server a processing completion report indicating that the child management file is received. When receiving the processing completion report, the management server manages an information life cycle of the child management file assuming the location of the child management file as another client.

According to the study of the inventors of the present invention, such an information life cycle management technique can be improved in the following respect that, when a client which requests replication of a management file needs to pass a child management file to another client, the child management file is temporarily brought out of control by an information life cycle management system, and therefore an information life cycle of the child management file cannot be managed.

It is therefore an object of the present invention to provide an information life cycle management system, an information management server apparatus, an information media controlling apparatus and a program which can manage an information life cycle of a child management file even when a client which requests replication of a management file needs to pass a child management file to another client.

An aspect of the present invention is an information life cycle management system which comprises: a plurality of information media controlling apparatuses that can communicate with each other; and an information management server apparatus, wherein the information media controlling apparatus includes a management file management table storing unit which stores a management file management table in which a child management file including a management ID and an electronic data main body is written, a unit which transmits new registration request information including an electronic data main body of a management target, to an information management server apparatus, a unit which transmits replication registration request information including a management ID associated with electronic data of a replication registration target and a post office box ID associated with an information media controlling apparatus of a replication acquisition destination, to the information management server apparatus, a unit which transmits a post office box check request including the post office box ID to the information management server apparatus, a unit which transmits a replication acquisition request including a child management ID associated with a management file of a replication acquisition target among child management IDs in post office box confirmation information received from the information management server apparatus, to the information management server apparatus, and a unit which writes a child management file received from the information management server apparatus, in the management file management table, wherein the information management server apparatus includes a system management table storing unit which stores a system management table in which a management ID and an entity ID are associated with each other and written, and a child management ID is associated with the management ID and written, a data original copy management table storing unit which stores a data original copy management table in which an entity ID and an electronic data main body are written, a post office box management table storing unit which stores a post office box management table in which a post office box ID and a child management ID are associated with each other and written, a unit which issues a management ID and an entity ID for an electronic data main body, based on the new registration request information, registers a management ID and an entity ID in the system management table, and registers an entity ID and an electronic data main body in the data original copy management table, a unit which, when receiving the replication registration request information, issues a child management ID different from a management ID in the replication registration request information, associates the child management ID with a same management ID as a management ID in replication registration request information among management IDs in the system management table and registers the issued child management ID in the system management table, associates the child management ID with a post office box ID in a replication registration request to register the child management ID and the post office box ID in the post office box management table, and transmits replication registration processing result information including a child management ID to an information media controlling apparatus which is a transmission source of the replication registration request information, a unit which, when receiving the post office box check request, reads a child management ID associated with a post office box ID in the post office box check request, from the post office box management table, and transmits post office box confirmation information including the child management ID, to an information media controlling apparatus which is a transmission source of the post office box check request, and a unit which, when receiving the replication acquisition request, reads an entity ID associated with a child management ID in the replication acquisition request, from the system management table, reads an electronic data main body associated with the entity ID from the data original copy management table, generates a child management file including the child management ID and the electronic data main body, deletes the child management ID from the post office box management table, and transmits the child management file to an information media controlling apparatus which is a transmission source of the replication acquisition request.

In addition, according to an aspect of the present invention, although each aggregation of apparatuses is represented as a system, the present invention is not limited to this, and each aggregation of apparatuses or each apparatus can be represented as an apparatus, method, program or a computer readable storage media which stores a program.

according to an aspect of the present invention, even when the information media controlling apparatus which requests replication registration of electronic data and the information media controlling apparatus which acquires a child management file generated by replication registration are separate apparatuses, the information management server apparatus registers a child management ID of electronic data and a post office box ID of the acquisition destination of a child management file, in the post office box management table based on replication registration request information received from one information media controlling apparatus, and has the other information media controlling apparatus which is the acquisition destination acquire the child management file based on the post office box management table.

Consequently, even when a client which requests replication of a management file needs to pass a child management file to another client, it is possible to manage an information life cycle of the child management file.

As described above, according to the present invention, it is possible to manage an information life cycle of a child management file even when a client which requests replication of a management file needs to pass a child management file to another client.

BRIEF DESCRIPTION OF THE SEVERAL VIEWS OF THE DRAWING

FIG. 4 is a schematic diagram illustrating a configuration of an information management DB according to the first embodiment.

FIG. 5 is a schematic diagram illustrating a configuration of a management ID table according to the first embodiment.

FIG. 7 is a schematic diagram illustrating a configuration of a post office box management table according to the first embodiment.

FIG. 8 is a schematic diagram illustrating a configuration of an access log table according to the first embodiment.

FIG. 9 is a schematic diagram illustrating a configuration of a master policy table according to the first embodiment.

FIG. 10 is a schematic diagram illustrating a configuration of a client management table according to the first embodiment.

FIG. 11 is a schematic diagram illustrating a configuration of a data original copy management table according to the first embodiment.

FIG. 12 is a schematic diagram illustrating a configuration of a management client DB according to the first embodiment.

FIG. 16 is a schematic diagram for describing an operation of new registration according to the first embodiment.

FIG. 24 is a schematic diagram for describing an operation of replication registration according to the first embodiment.

FIG. 25 is a schematic diagram for describing an operation of replication registration according to the first embodiment.

FIG. 30 is a schematic diagram for describing an operation of replication acquisition according to the first embodiment.

FIG. 34 is a schematic diagram illustrating a configuration of an information life cycle management system according to a second embodiment of the present invention.

FIG. 35 is a schematic diagram illustrating a configuration of an information life cycle management system according to a third embodiment of the present invention.

DETAILED DESCRIPTION OF THE INVENTION

Figure 1:
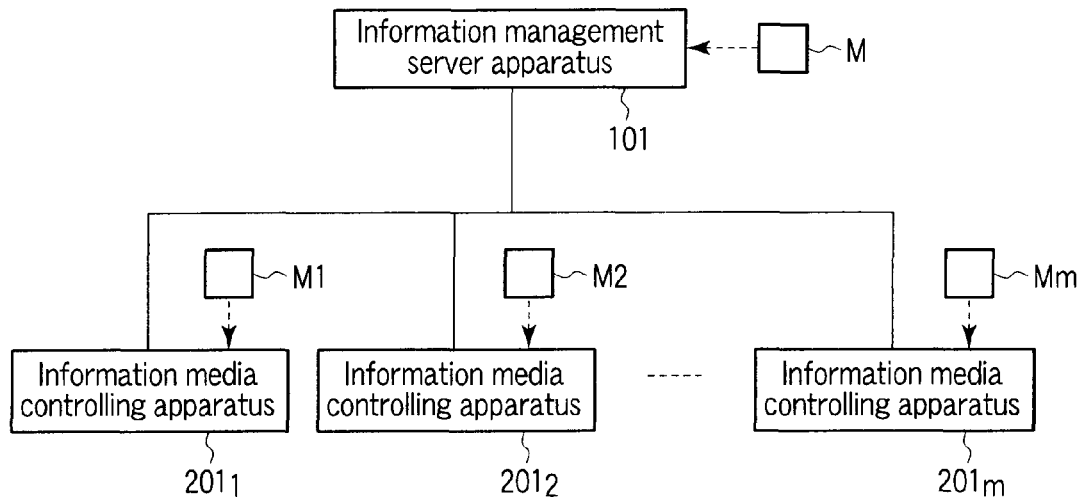
FIG. 1 is a schematic diagram illustrating a configuration of an information life cycle management system according to each embodiment of the present invention.

Hereinafter, each of embodiments of the present invention will be described using drawings. Incidentally, each of the following apparatuses can be implemented with a hardware configuration or a combined configuration of hardware resources and software. As illustrated in FIG. 1, for software of the combined configuration, a program is used which is installed in computers of corresponding apparatuses 101, and $201_1$ to $201_m$, in advance from a network or storage media M and M1 to Mm and which realizes functions of the corresponding apparatuses 101 and $201_1$ to $201_m$.

First, terms and an overview will be described which serve as a precondition for an information life cycle management system in this description. FIG. 1 is a schematic diagram illustrating a configuration of an information life cycle management system according to each embodiment of the present invention. This information life cycle management system employs a configuration where an information management server apparatus 101 which uniformly and systematically manages information media and a plurality of information media controlling apparatuses $201_1$ to $201_m$ which use uniformly and systematically manage information media can individually communicate. Here, any information media controlling apparatus of each of the information media controlling apparatuses $201_1$ to $201_m$ will be represented as "information media controlling apparatus 201".

The information media controlling apparatus 201 has a storage device which stores a management file management table and the following functions (f201-1) to (f201-5) as a generalized configuration except various authorizing functions and log storing functions. In the management file management table, a child management file including a management ID and an electronic data main body is written.

(f201-1) denotes a function of transmitting new registration request information including an electronic data main body of a management target, to the information management server apparatus 101.

(f201-2) denotes a function of transmitting to the information management server apparatus 101 replication registration request information including a management ID associated with electronic data of a replication registration target and a post office box ID associated with the information media controlling apparatus 201 of a replication acquisition destination.

(f201-3) denotes a function of transmitting a post office check box request including a post office box ID, to the information management server apparatus 101.

(f201-4) denotes a function of transmitting to the information management server apparatus 101 a replication acquisition request including a child management ID associated with a management file of a replication acquisition target among child management IDs in post office box confirmation information received from the information media controlling apparatus 201.

(f201-5) denotes a function of writing a child management file received from the information management server apparatus, in a management file management table.

The information management server apparatus 101 has a storage device which has a system management table, a data original copy management table and a post office box management table, and the following functions (f101-1) to (f101-5) as a generalized configuration except various authorizing functions and log storing functions. In the system management table, management IDs and entity IDs are associated and written, and child management IDs are associated with the management IDs and written. In the data original copy management table, entity IDs and electronic data main bodies are written. In the post office box management table, post office box IDs and child management IDs are associated with each other and written.

(f101-1) denotes a function of issuing a management ID and entity ID for an electronic data main body based on new registration request information received from the information media controlling apparatus 201, registering the management ID and entity ID in the system management table, and registering the entity ID and electronic data main body in the data original copy management table.

(f101-2) denotes a function of issuing a child management ID different from a management ID in replication registration request information when receiving replication registration request information, associating the child management ID with the same management ID as the management ID in replication registration request information among management IDs in the system management table and registering this issued child management ID in this system management table, associating and registering this child management ID and a post office box ID in a replication registration request in a post office box management table, and transmitting replication registration processing result information including the child management ID, to the information media controlling apparatus 201.

(f101-3) denotes a function of, when receiving a post office box check request, reading a child management ID associated with the post office box ID in the post office box check request from the post office box management table, and transmitting post office box confirmation information including this child management ID, to the information media controlling apparatus 201.

(f101-4) denotes a function of, when receiving a replication acquisition request, reading an entity ID associated with a child management ID in a replication acquisition request from a system management table, reading an electronic data main body associated with this entity ID from a data original copy management table, and generating a child management file including this child management ID and electronic data main body.

(f101-5) denotes a function of deleting the child management ID from the post office box management table, and transmitting the child management file to the information media controlling apparatus 201.

Here, information media mean "media containing information" such as electronic data or physical media (paper media or storage media). For storage media, CDROM, DVD, SD card, FD and the like can be used, for example. Accompanying this, each of the information media controlling apparatuses $201_1$ to $202_m$ can be realized if an apparatus can receive an input of electronic data. For example, each of the information media controlling apparatuses $201_1$ to $202_m$ is realized as various apparatuses such as a mobile telephone, a PC (Personal Computer), a digital all-in-one machine, a printer, a copying machine, a scanner, a shredder, a microfilm reader, a DVD reader, and a multi-drive, and operates in conjunction with the information management server apparatus 101.

Such an information life cycle management system assigns a unique management ID (Identification) for individual identification of the above information media, connects the status related to creation/discard of information media, an interrelationship (system or media type) and media use of information media with an information original copy based on the management ID for uniform and systematic management.

When an information medium is electronic data, the information life cycle management system converts this electronic data into an electronic file of a file format including a management ID. The converted electronic file is referred to as a "management file".

The management file includes header information including a management ID and attribute information, an access control policy and authorization information for this management file, in addition to the electronic data main body of target information. As illustrated in a configuration example of FIG. 2, the management file has a header part, an access control policy part, a body part and an authentication data part.

The header part includes a management ID of this electronic data, a management ID of parent information media, generation number, media type, file information, file storage information, and information management server information. However, the configuration of the header part is not limited to this.

For the management ID of parent information media, for example, a management ID of source electronic data when electronic data is copied, a management ID of source electronic data when electronic data is printed on paper media and the paper is output, and a management ID assigned to paper media when paper media converted by a scanner into electronic data are used.

The generation number is a generation numerical value which indicates which generation this management file belongs to in the system relationship managed as parent, child and grandchild, starting from the management file registered first in this management system. For example, when the generation number of a parent management file is 1, the generation number of child information media of its replication is 2, and further, the generation number of grandchild information media of replication of the child information media is 3. However, the expression format of the generation numbers is not limited to this.

The file information includes a file format of this electronic data, file size, creator information of this electronic data, creation date information, and creation location information.

The file storage information includes information indicating whether or not this electronic data main body stored in the body part is encrypted, and further includes information related to a cryptographic algorithm, a cryptographic key, and cryptographic module when the electronic data main body is encrypted.

The information management server information verifies a MAC address and an IP address, URI, and an authentication data part of the information management server. Information for verifying the authentication data part may store cryptographic key information or a cryptographic key certificate related to this key.

The access control policy part stores access control policy information related to use constraint which discloses processing of this electronic file to be permitted or forbidden according to the use condition of this electronic file. Here, the use condition includes, for example, available deadline, available location information or network environment, a user or available equipment information and the number of uses.

The body part stores the electronic data itself or encrypted data obtained by encrypting this electronic data.

The authentication data part stores authentication data information including the header part, access control policy part, and body part encrypted by the information management server apparatus. As authentication data information, digital signature using public key cryptosystem such as DSA (Digital Signature Algorithm), RSA (Rivest-Shamir-Adleman Scheme), and ECDSA (Elliptic Curve DSA) or MAC (Message Authentication Code) using a hash function or symmetric key cryptosystem can be used.

The context in which the information life cycle management system of this description is used, as well as terms related thereto, have been described above. As described above, such an information life cycle management system can desirably manage an information life cycle of a child management file even when a client which requests replication of a management file needs to pass the child management file to another client. Hereinafter, each embodiment of this information life cycle management system will be sequentially described.

First Embodiment

Figure 3:
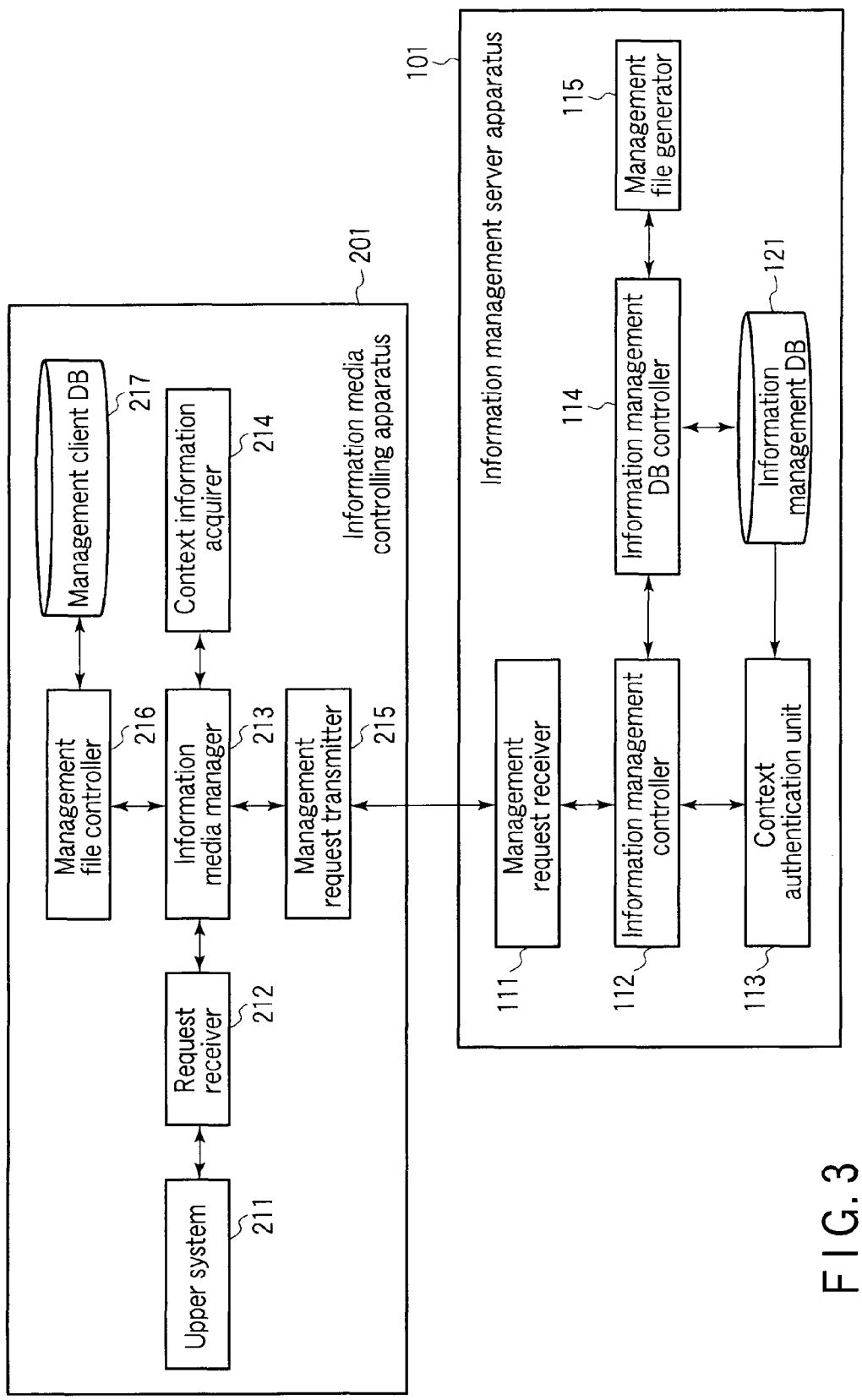
FIG. 3 is a schematic diagram illustrating a configuration of an information life cycle management system according to a first embodiment of the present invention.

FIG. 3 is a schematic diagram illustrating a configuration of an information life cycle management system according to a first embodiment of the present invention, and illustrates one information management server apparatus 101 and any information media controlling apparatus 201 of the configuration illustrated in FIG. 1. Incidentally, although functions unique to apparatuses such as the above described mobile telephone and PC are respectively different between the information media controlling apparatuses $201_1$ to $201_m$ illustrated in FIG. 1, the function related to the information life cycle management system employs the same configuration, and therefore an arbitrary information media controlling apparatus 201 will be illustrated as a typical example.

Here, the information management server apparatus 101 has a management request receiver 111, an information management controller 112, a context authentication unit 113, an information management DB controller 114, a management file generator 115, and an information management DB 121.

Incidentally, each unit may be integrally configured where necessary when received information is output as is. For example, the management request receiver 111 and information management controller 112 may be integrally formed when received information is output as is. Further, that each unit may be integrally formed where necessary when received information is output applies to the other apparatuses and the following embodiments in the same manner.

Here, the management request receiver 111, information management controller 112, context authentication unit 113, information management DB controller 114, and management file generator 115 are functional blocks realized when a CPU (not illustrated) executes the program including each step of the information management server apparatus 101 described below.

The information management DB 121 can be realized as a storage device which the CPU (not illustrated) can read and write from and to, and, as illustrated in FIG. 4, stores a management ID table 1211, a system management table 1212, a post office box management table 1213, an access log management table 1214, a master policy table 1215, a client management table 1216, and a data original copy management table 1217.

As illustrated in FIG. 5, the management ID table 1211 associates and stores issued management IDs, issue dates, and issue request source information, and further associates and stores expiration dates and expiration request source information in case of expiration.

Figure 6:
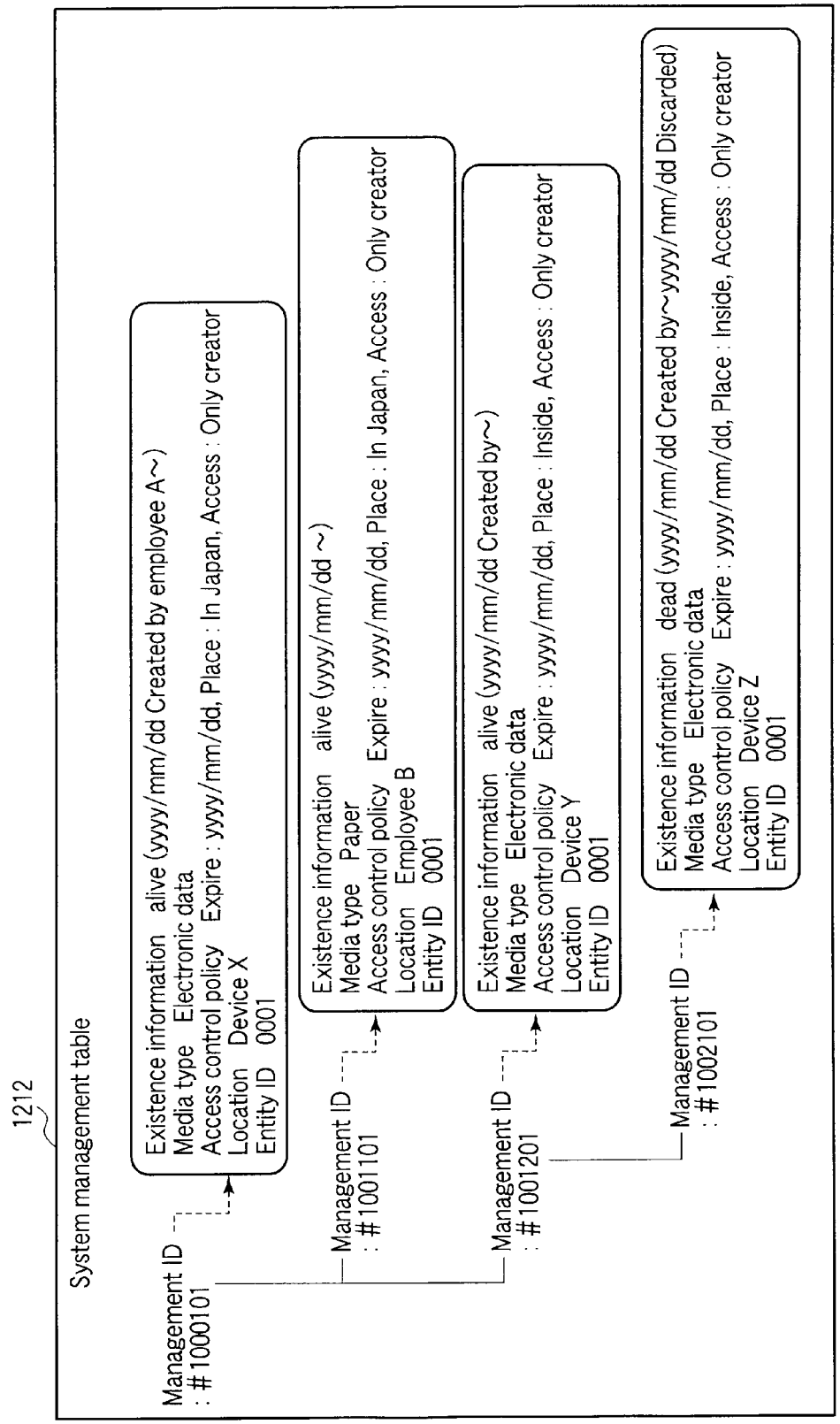
FIG. 6 is a schematic diagram illustrating a configuration of a system management table according to the first embodiment.

As illustrated in FIG. 6, the system management table 1212 associates and stores management IDs associated with a parent-child relationship of an electronic data main body, creation date information of the electronic data main body, user information, media type, access control policy, location information, and entity IDs. When electronic data is replicated data, the system management table 1212 associates and stores management IDs additionally issued for replication, creation date information in a header part of a replicated (child) management file, user information, media type, access control policy, location information, and entity IDs, for an electronic data main body or management ID of a management file of the replication source (parent). Here, the system of issue numbers of management IDs may adopt serial numbers as long as oneness in this system is secured and replication parent-child relationships are connected with management IDs and managed. Further, the configuration of the management ID may be issued with a meaning such that the parent-child relationship of each management ID is clear. In this case, for example, a value of a specific digit may have a parent-child relationship value. With an example of FIG. 6, the lower fourth digit (thousands digit) indicates the parent-child relationship value, and "0" indicates the uppermost parent, "1" indicates a child of this parent, and "2" indicates a child of this child (=grandchild of the parent). Incidentally, the lower third digit (hundreds digit) indicates a media type, and "1" indicates electronic data, "2" indicates paper media, and "3" indicates recording media. The lower first and second digits (ones digit and tens digit) are identification numbers for the same generation and the same media type. The lower fifth to eighth digits (# and three digit values right to #) indicate electronic data IDs, and may include the same electronic data irrespective of the parent-child relationship as long as the management file has the same electronic data ID. Further, equipment X, Y and Z, and employee B in location information are associated with any of information media controlling apparatuses 201x, 201y, 201z and 201B, and therefore may be read as information media controlling apparatuses 201x, 201y, 201z and 201B. In addition, a management file is not created from the uppermost parent for which the parent-child relationship value indicates "0". Management files are created from parents for which the parent-child relationship indicates "1" or more. Further, the entity ID identifies an electronic data main body (data original copy) and has a management ID different from the above management ID when electronic data is replicated, and the entity ID of the replication source (parent) and the entity ID of replication (child) are the same.

As illustrated in FIG. 7, the post office box management table 1213 associates and stores per post office box ID the number of postings (the number of acquisition) which means the number of child management files to acquire, and a management ID list listing management IDs of the child management files to acquire. Although a case will be described as an example where the post office box ID is assigned per information media controlling apparatus 201, the post office box ID is not limited to this, and any information media controlling apparatus 201 may be configured to specify any post office box ID.

As illustrated in FIG. 8, the access log management table 1214 includes a client ID, operation type, management ID, and processing status per operation date. The client ID indicates an employee ID of the employee who performed the operation, and may be read as "operator ID" or "employee ID". The operation type indicates types of operations such as login status, new registration, electronic data replication, viewing, and deletion. The management ID indicates operated electronic data. The processing status is status information indicating a processing result such as success or failure (authorization error) of processing indicated by the operation type. In addition, management of contents in the access log table 1214 may include use of location information (inside/outside, and GPS information) of the equipment which utilizes a target management file, and is not limited to the information illustrated in FIG. 8.

As illustrated in FIG. 9, the master policy table 1215 associates and stores a policy type and rejection/permission policy per policy number. The policy number is policy identification information, and may be read as "policy ID". The policy type is information showing the type of a target to be controlled according to the rejection/permission policy, and may be, for example, location control, time control and permission control where necessary. The rejection/permission policy is information indicating a decision condition and control contents when the decision condition is satisfied. Control contents include a target (command or request) to permit or reject, and can include processing such as inside wired connection or inside wireless connection.

As illustrated in FIG. 10, the client management table 1216 associates and stores client IDs, employee numbers, authority classes, terminal types and MAC addresses.

As illustrated in FIG. 11, the data original copy management table 1217 associates and stores entity IDs, file names, sizes, hash values, electronic data main bodies and external storage information. Here, the entity ID is identification information for an electronic data main body (data original copy). The file name is a file name of the management target data main body (electronic data main body) to be stored in the management file. The size is a file size of a management target data main body to be stored in the management file. The hash value is a hash value of a management target data main body to be stored in the management file. The electronic data main body is a management target data main body to be stored in the management file. When the management target data main body is stored outside the information management DB 121, the external storage information is storage destination information of this management target data main body. With the present embodiment, external storage information is not used.

By contrast with this, as illustrated in FIG. 3, the information media controlling apparatus 201 has an upper system 211, a request receiver 212, an information media manager 213, a context information acquirer 214, a management request transmitter 215, a management file controller 216, and a management client DB 217. In addition, each unit may be integrated where necessary. For example, when received information is output as is, the request receiver 212, information media manager 213, management request transmitter 214, and management file controller 216 may be integrated.

Here, the upper system 211, request receiver 212, information media manager 213, context information acquirer 214, management request transmitter 215, and management file controller 216 are functional blocks realized when, for example, a CPU (not illustrated) executes the program including each step of the information media controlling apparatus 201 described below.

The management client DB 217 can be realized as a storage device which the CPU (not illustrated) can read and write from and to and which the management file controller 216 can access, and, as illustrated in FIG. 12, stores a management file management table 2171 and an access log table 2172.

The management file management table 2171 includes, per management ID, status information (for example, during viewing,—(obsolete), available), management file attribute information (creation date information and obsolete date information in case of obsolete), and management file entity. As management file attribute information, partial information of a management file header part is used. As partial information of the management file header part, a management ID associated with an electronic data main body of the uppermost parent which is the replication source of the management file or a management ID indicating the management file of the replication source can be used in addition to the above creation/obsolete data information. "The management file of the replication source" means "the parent management file which is the source of a child management file to be replicated". Meanwhile, the description range of the management file attribute information is not limited to partial information of a management file header part, and can adopt various modes based on the environment setting of the equipment and the prescription of the information management server apparatus. Further, management file attribute information may include dynamic use information which is not described in the management file header part, such as the number of accesses from the equipment to each management file. The management file entity may be stored in an external storage device (not illustrated).

The access log table 2172 includes an operation type, user information, management ID and management file name per operation date. The operation type indicates types of operations such as login status, new registration, replication registration, post office box check, replication acquisition, viewing, and deletion. The management ID indicates operated electronic data. The management file name is, for example, information connecting an extension indicating a file format of electronic data, to a management ID of the electronic data. In addition, contents managed in the access log table 2171 may be location information (inside/outside, and GPS information) of the equipment which utilizes a target management file, and is not limited to the information illustrated in FIG. 12.

Next, an operation of an information life cycle management system employing the above configuration will be described using the schematic diagrams of FIGS. 13 to 33. Incidentally, the operation will be described sequentially in order of new registration of electronic data (FIGS. 13 to 17), replication registration of electronic data (FIGS. 18 to 26) and replication acquisition of electronic data (FIGS. 27 to 33).

(New Registration of Electronic Data: FIGS. 13 to 17)

When a management file entity including unregistered electronic data is newly registered in the information media controlling apparatus 201, the information media controlling apparatus 201 and information management server apparatus 101 execute the following processing. First, the generalized operation not including various authorizing operations will be described.

(Generalized Operation of New Registration)

The information media controlling apparatus 201 transmits new registration request information including an electronic data main body of a management target, to the information management server apparatus 101.

The information management server apparatus 101 issues a management ID and entity ID for the electronic data main body, based on new registration request information, registers the management ID and entity ID in the system management table 1212, and registers the entity ID and electronic data main body in the data original copy management table 1217.

Next, such a new registration operation including various authorizing operations will be described in detail.

(Detailed Operation of New Registration)

Figure 13:
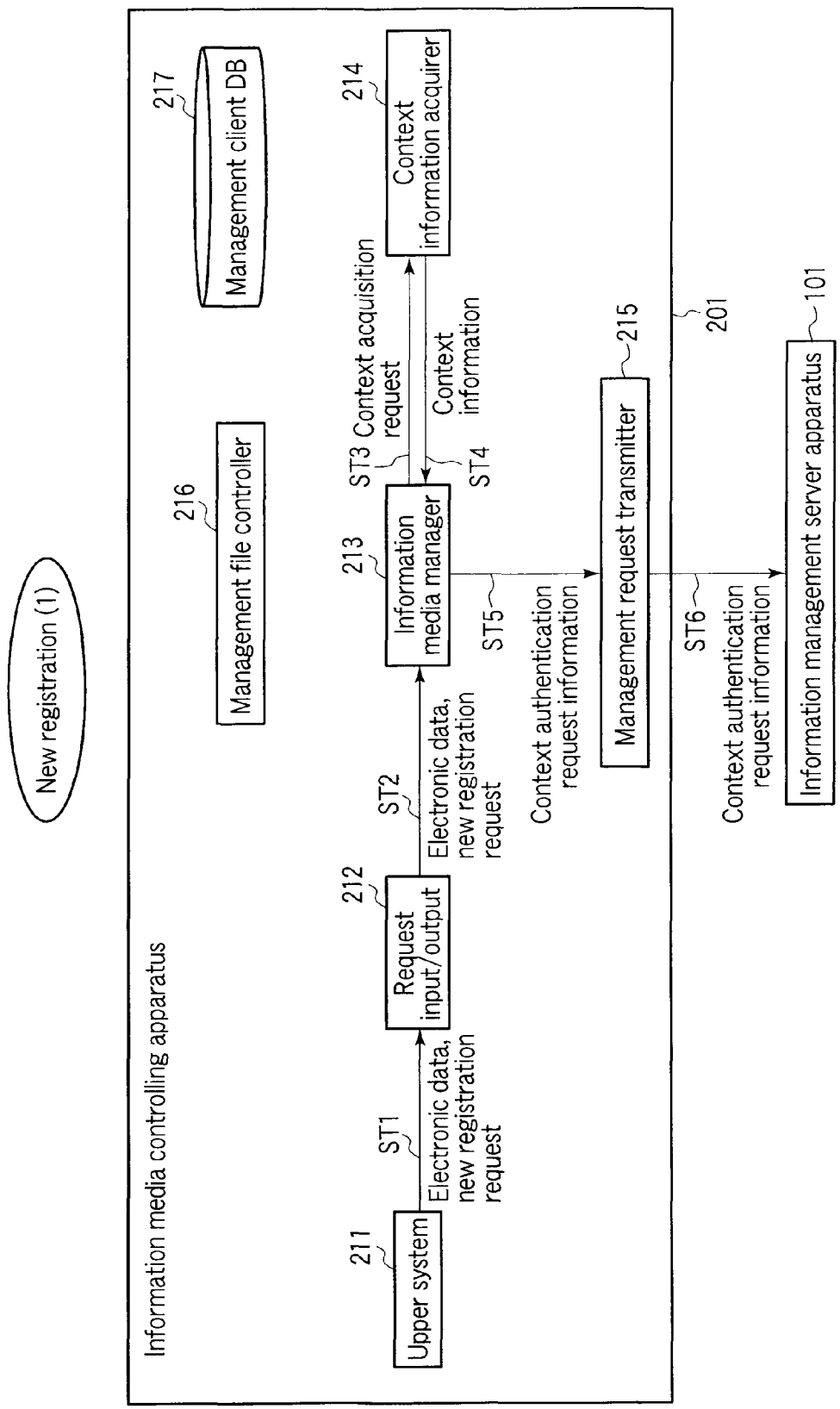
FIG. 13 is a schematic diagram for describing an operation of new registration according to the first embodiment.

As illustrated in FIG. 13, the upper system 211 outputs unregistered electronic data and a new registration request to the request receiver 212, according to the operation of the operator (electronic data creator) (ST1). The new registration request includes an access control policy related to use limitation of the electronic data, and creator information indicating the electronic data creator. Creator information is user information including, for example, a client ID and an employee number.

The request receiver 212 outputs this electronic data and new registration request to the information media manager 213 according to, for example, the receiving order (ST2).

When receiving electronic data and a new registration request, the information media manager 213 outputs a context acquisition request for acquiring context information required for the requested processing, to the context information acquirer 214 (ST3).

The context information acquirer 214 acquires context information related to the information media controlling apparatus 201 from an operating system or related hardware of the information media controlling apparatus 201 according to the context information acquisition request, and outputs this context information to the information media manager 213 (ST4). Here, as context information, for example, equipment information such as a MAC address or IP address related to the information media controlling apparatus 201, information related to a connection network such as domain information or connectable equipment information or physical position information of the equipment such as a GPS can be adequately used.

When receiving context information, the information media manager 213 outputs context authentication request information including creator information and context information in the new registration request, to the management request transmitter 215 (ST5).

The management request transmitter 215 transmits context authentication request information to the information management server apparatus 101 (ST6).

Figure 14:
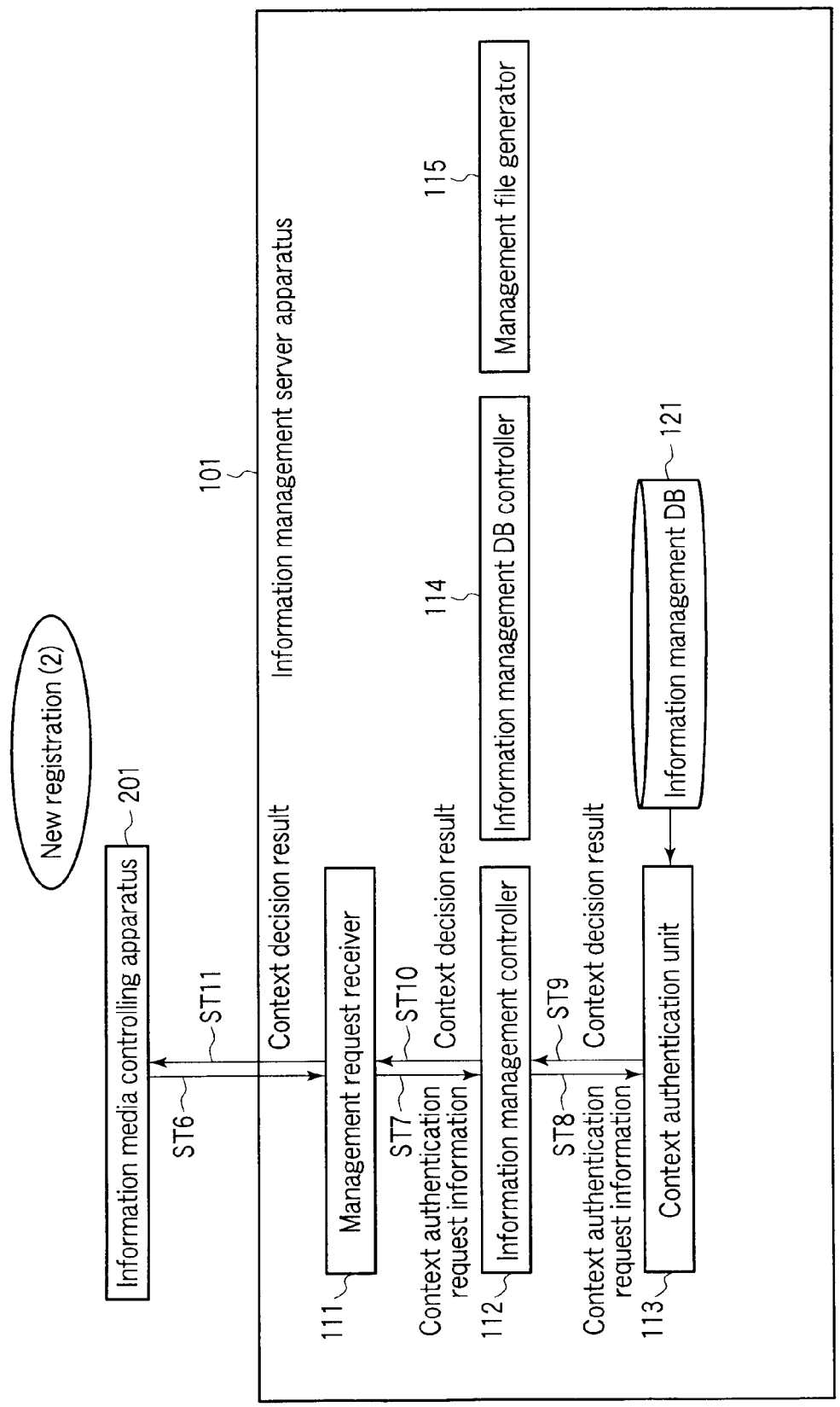
FIG. 14 is a schematic diagram for describing an operation of new registration according to the first embodiment.

In the information management server apparatus 101, as illustrated in FIG. 14, the management request receiver 111 outputs this context authentication request information to the information management controller 112 according to, for example, the receiving order (ST7).

The information management controller 112 outputs context authentication request information to the context authentication unit 113, and requests authorization of this context information (ST8).

When acquiring context authentication request information, the context authentication unit 113 acquires an authority class associated with creator information (employee number)

indicating a request source user and an authority class depending on connection mode, referring to the client management table 1216 in the information management DB 121. When security authorization information such as a digital signature or MAC is assigned in context authentication request information, the validity of this security authorization information is verified. When creator information or the connection environment in context information is not clear or when the verifying result of security authorization information indicates "unauthorized", decision result information indicating "error" is output to the information management controller 112. Further, when creator information and connection environment in context information is clear or when the verifying result of security authorization information indicates "authorized", the context authentication unit 113 outputs the context decision result related to the identity or authority of the client, to the information management controller 112 (ST9). Here, the identity of the client is the above creator information and the authority of the client is the authority class acquired from the client management table 1216.

The information management controller 112 outputs the context decision result to the management request receiver 111 (ST10).

The management request receiver 111 transmits the context decision result to the information media controlling apparatus 201 (ST11).

Figure 15:
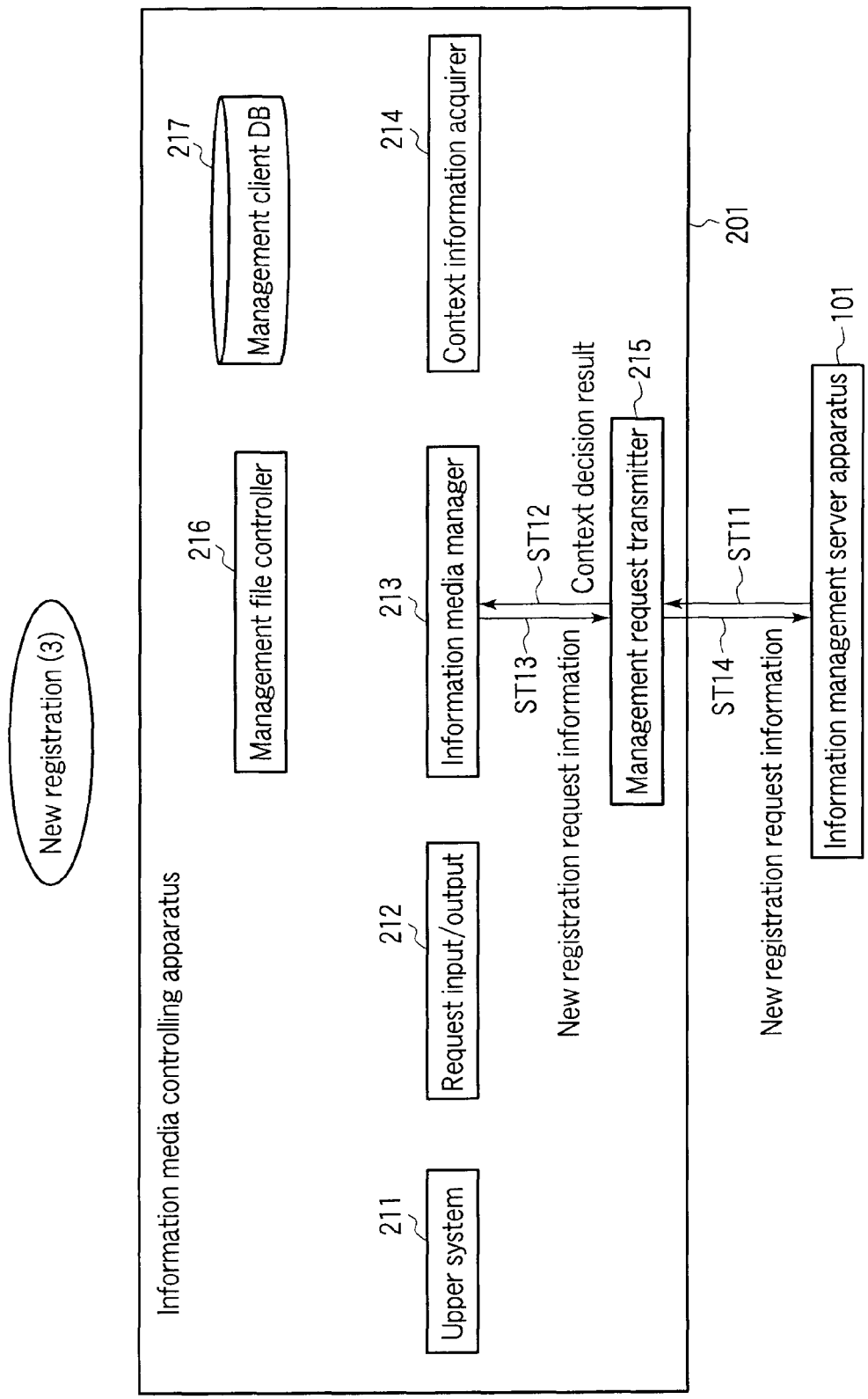
FIG. 15 is a schematic diagram for describing an operation of new registration according to the first embodiment.

As illustrated in FIG. 15, the management request transmitter 215 outputs the received context decision result to the information media manager 213 (ST12).

When the context decision result indicates "error", the information media manager 213 reports "error" to the upper system 211 through the request input/output 212. When the context decision result does not indicate "error", new registration request information of electronic data which is a registration target is output to the management request transmitter 215 (ST13). Here, new registration request information includes an access control policy related to electronic data which is a registration target and use limitation of the electronic data.

The management request transmitter 215 transmits new registration request information to the information management server apparatus 101 (ST14).

As illustrated in FIG. 16, the management request receiver 111 outputs new registration request information to the information management controller 112 (ST15).

The information management controller 112 outputs new registration processing request information including this new registration request information and context decision result, to the information management DB controller 114, and requests new registration processing of electronic data (ST16).

When receiving new registration processing request information, the information management DB controller 114 cross-checks new registration processing request information and the master policy table 1215 of the information management DB 121, and, as a result of the cross-checking, executes double registration confirmation of whether or not target electronic data is already registered as long as the cross-check result is permitted or not rejected according to the permission/rejection policy in the master policy table 1215.

According to the cross-check processing, the context decision result in new registration processing request information and the master policy table 1215 of the information management DB 121 are cross-checked, and processing proceeds to double registration confirmation only when, as a result of cross-checking, information related to the identity or authority of the client in the context decision result is permitted or not rejected according to the permission/rejection policy of the master policy table 1215 and other information such as the request receiving time or IP address of the information media controlling apparatus 201 is also permitted or not rejected according to the permission/rejection policy.

According to double registration confirmation processing, a hash value of electronic data newly registered in the past is registered in advance in the system management table 1212 of the information management DB 121, and the hash value of electronic data which is a current new registration target is calculated to confirm whether or not the hash value does not exist in the system management table 1212.

When electronic data of the current new registration target is not already registered, the information management DB controller 114 issues the management ID and entity ID for the data, and registers management ID issue information including the management ID, issue date and issue request source information, in the management ID table 1211 in the information management DB 121.

Further, the information management DB controller 114 associates and registers the issued entity ID, file name of the electronic data main body, size of the electronic data main body (file size), hash value of the electronic data main body and the electronic main data main body, in the data original copy management table 1217.

Further, the information management DB controller 114 registers access log information including the date, client ID, operation type, management ID and processing status, in the access log management table 1214 in the information management DB 121.

After registration, the information management DB controller 114 outputs new registration processing result information including the management ID, to information management controller 112 (ST17). The new registration processing result information includes information to be registered in the tables 2171 and 2172 in the management client DB 217, more specifically, includes the management ID, date, and operation type.

The information management controller 112 outputs new registration processing result information to the management request receiver 111 (ST18).

The management request receiver 111 transmits new registration processing result information to the information media controlling apparatus 201 (ST19).

Figure 17:
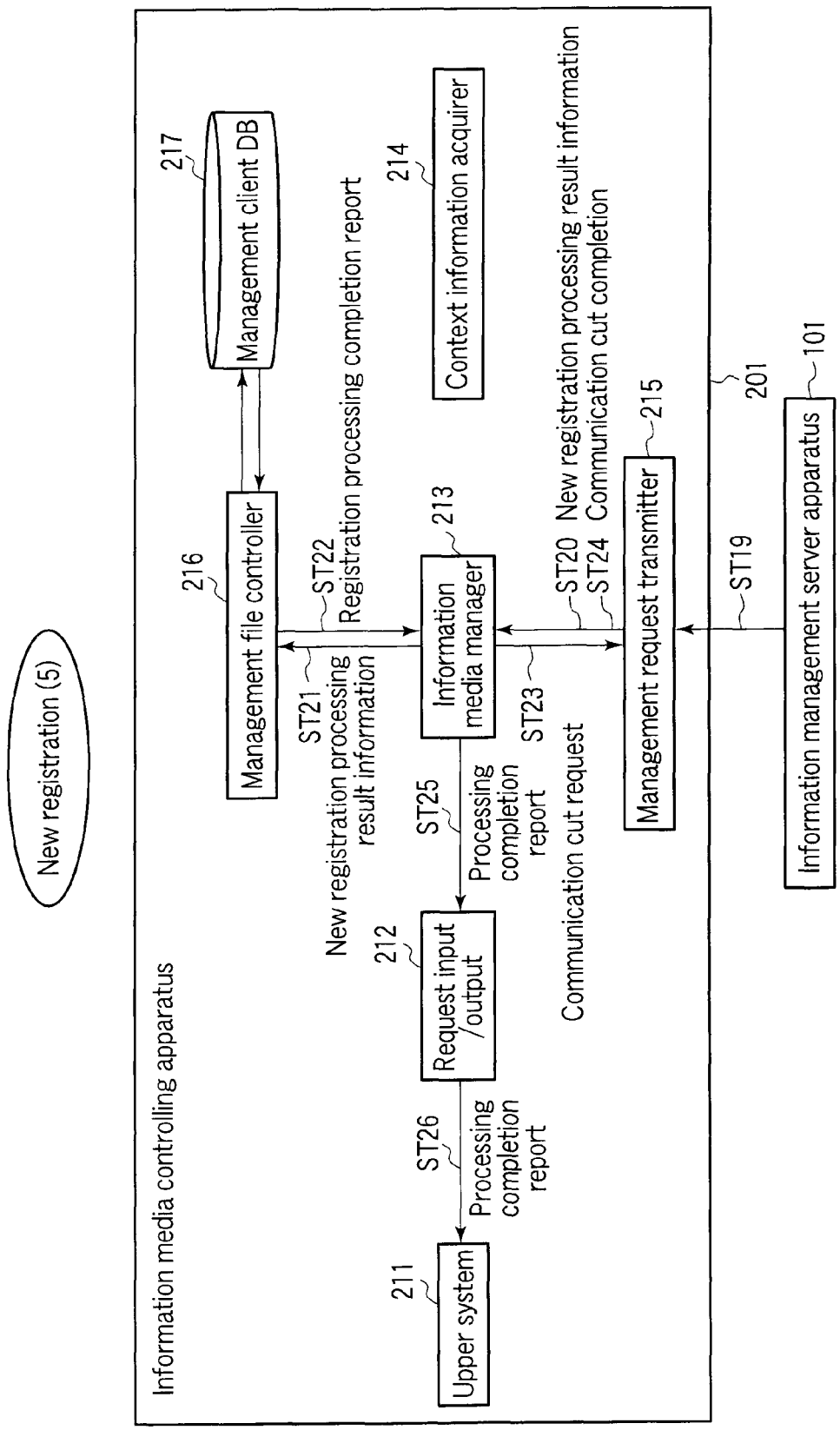
FIG. 17 is a schematic diagram for describing an operation of new registration according to the first embodiment.

As illustrated in FIG. 17, the management request transmitter 215 outputs new registration processing result information to the information media manager 213 (ST20).

The information media manager 213 outputs new registration processing result information to the management file controller 216, and requests registration of the processing result in the management client DB 217 (ST21).

To reflect the status in which the management ID is used as a main key in the management client DB 217 based on new registration processing result information, the management file controller 216 registers the management ID and the status in the management file management table 2171.

Next, to reflect an operation log in the management client DB 217, the management file controller 216 registers a new registration operation log including operation date information, the operation type, and management ID, in the access log table 2172 of the management client DB 217.

After registration is completed, the management file controller 216 outputs a registration processing completion report to the information media manager 213 (ST22).

When receiving the registration processing completion report, the information media manager 213 requests the management request transmitter 215 to cut communication with the information management server apparatus 101 (ST23).

The management request transmitter 215 cuts communication with the information management server apparatus 101, and outputs a completion report to the information media manager 213 (ST24).

The information media manager 213 outputs a new registration processing completion report of newly registered electronic data to the request input/output 212. The new registration processing completion report may include the management ID issued for this electronic data (ST25).

The request input/output 212 outputs the new registration processing completion report to the upper system 211, and finishes processing (ST26).

(Replication Registration of Electronic Data: FIGS. 18 to 26)

First, the generalized operation, excluding various authorizing operations, will be given.

(Generalized Operation of Replication Registration)

The information media controlling apparatus 201 transmits replication registration request information, which includes a management ID associated with electronic data of a replication registration target and a post office box ID associated with the information media controlling apparatus 201 of the replication acquisition destination, to the information management server apparatus 101.

When receiving replication registration request information, the information management server apparatus 101 issues a child management ID different from a management ID in this replication registration request information, associates the child management ID with the same management ID as the management ID in replication registration request information among management IDs in the system management table 1212, registers this issued child management ID in this system management table 1212, associates this child management ID with a post office box ID in a replication registration request to register them in the post office box management table 1216, and transmits replication registration processing result information including the child management ID, to the information media controlling apparatus 201 which is the transmission source of replication registration request information.

Next, the operation of this replication registration including various authorization operations will be described in detail.

(Detailed Operation of Replication Registration)

When a certain information media controlling apparatus 201*i* requests to the information server apparatus 101 such that the information media controlling apparatus 201*j* can acquire replicated electronic data of electronic data registered in this system, the information media controlling apparatus 201*i* and information management server apparatus 101 execute the following processing.

Figure 18:
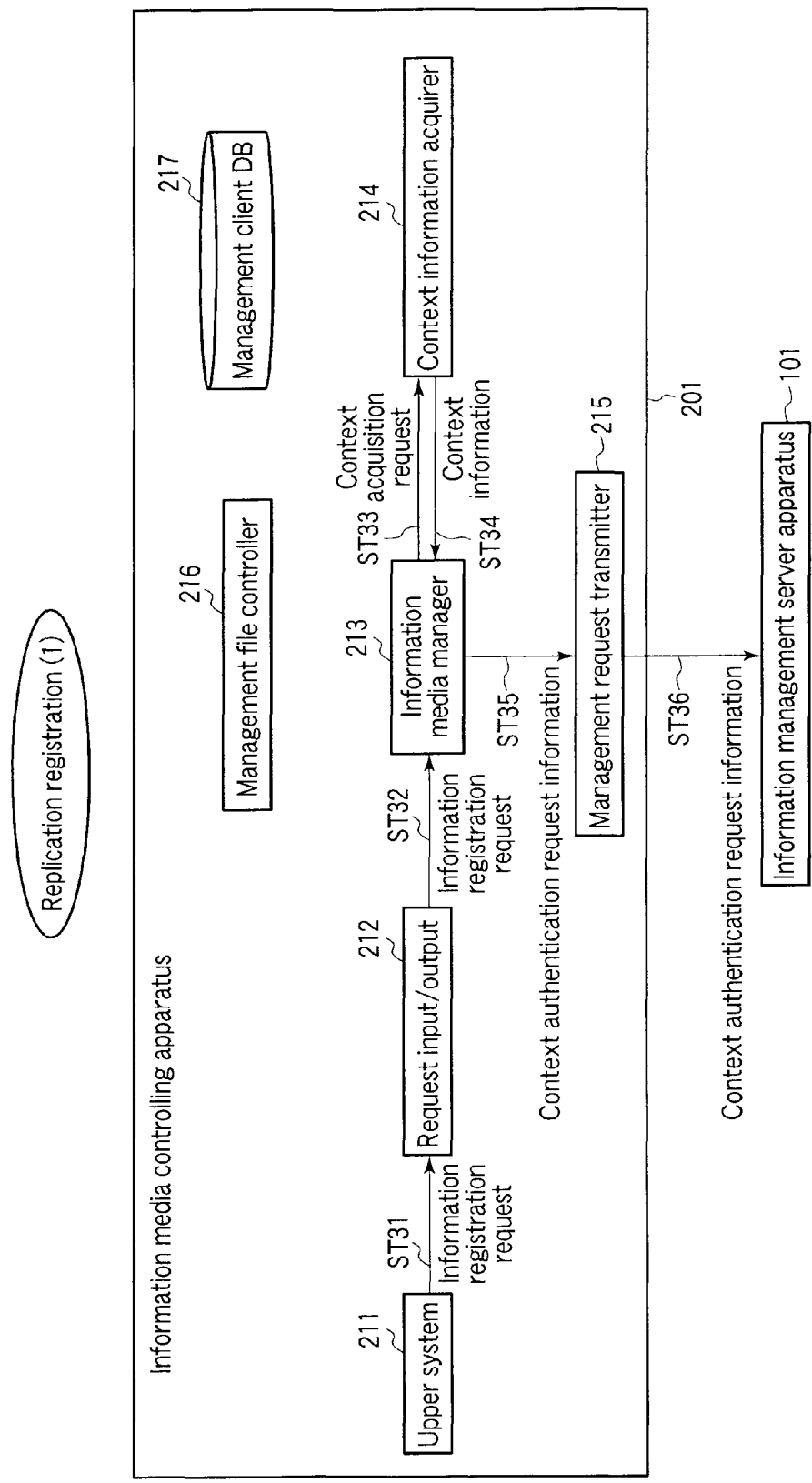
FIG. 18 is a schematic diagram for describing an operation of replication registration according to the first embodiment.

As illustrated in FIG. 18, the upper system 211 outputs an access control policy acquisition request for acquiring an access control policy of the electronic data main body associated with the management ID which needs to be replicated, to the request input/output 212 according to the operation by the operator (ST31). The access control policy acquisition request includes user information related to a user which makes an acquisition request, and a management ID associated with the electronic data main body which is the request target. The access control policy acquisition request may include location information of the information media controlling apparatus 201, IP address, MAC address, and use environment information of a connection network. This management ID is referred to as "parent management ID".

Figure 19:
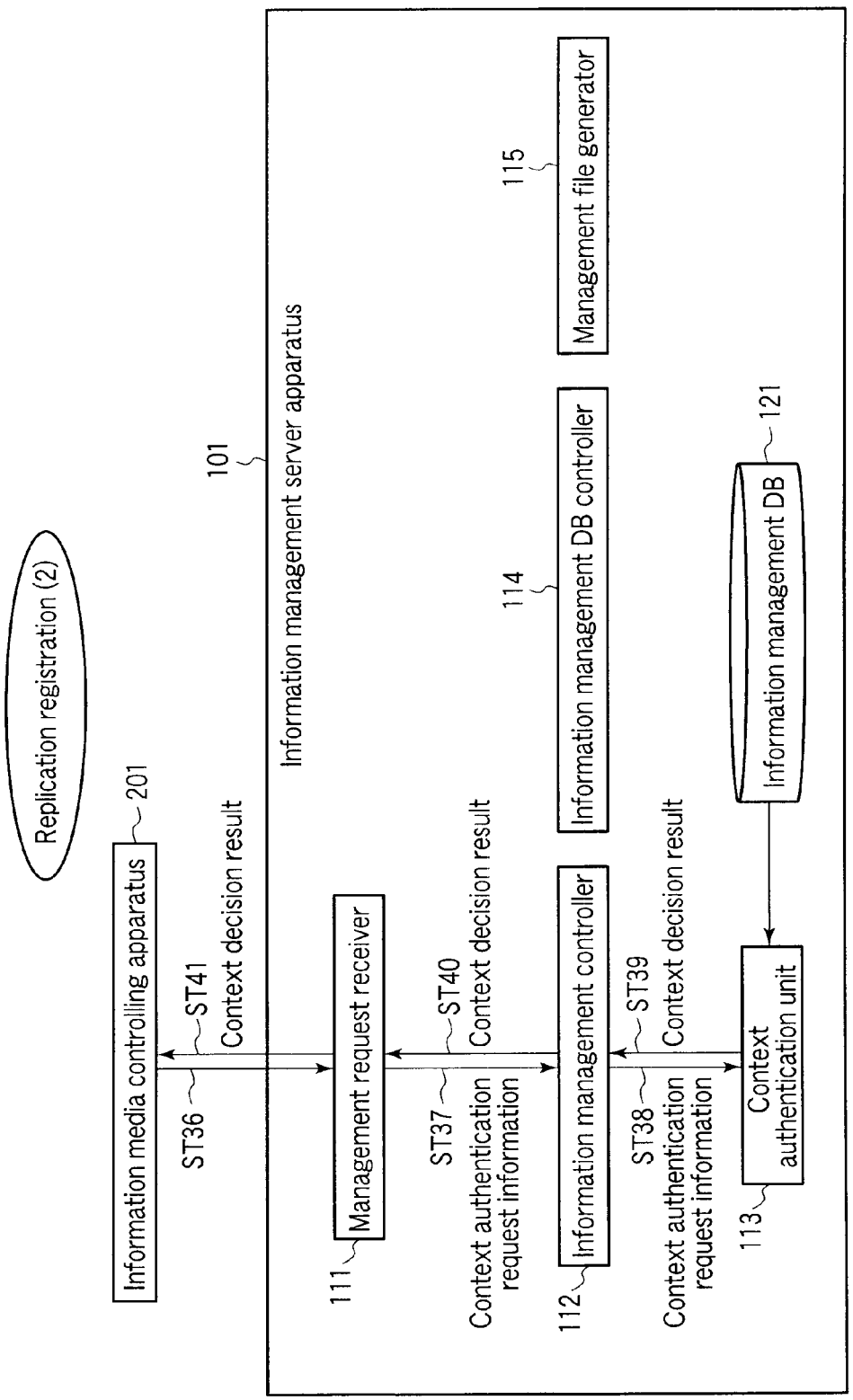
FIG. 19 is a schematic diagram for describing an operation of replication registration according to the first embodiment.
Figure 20:
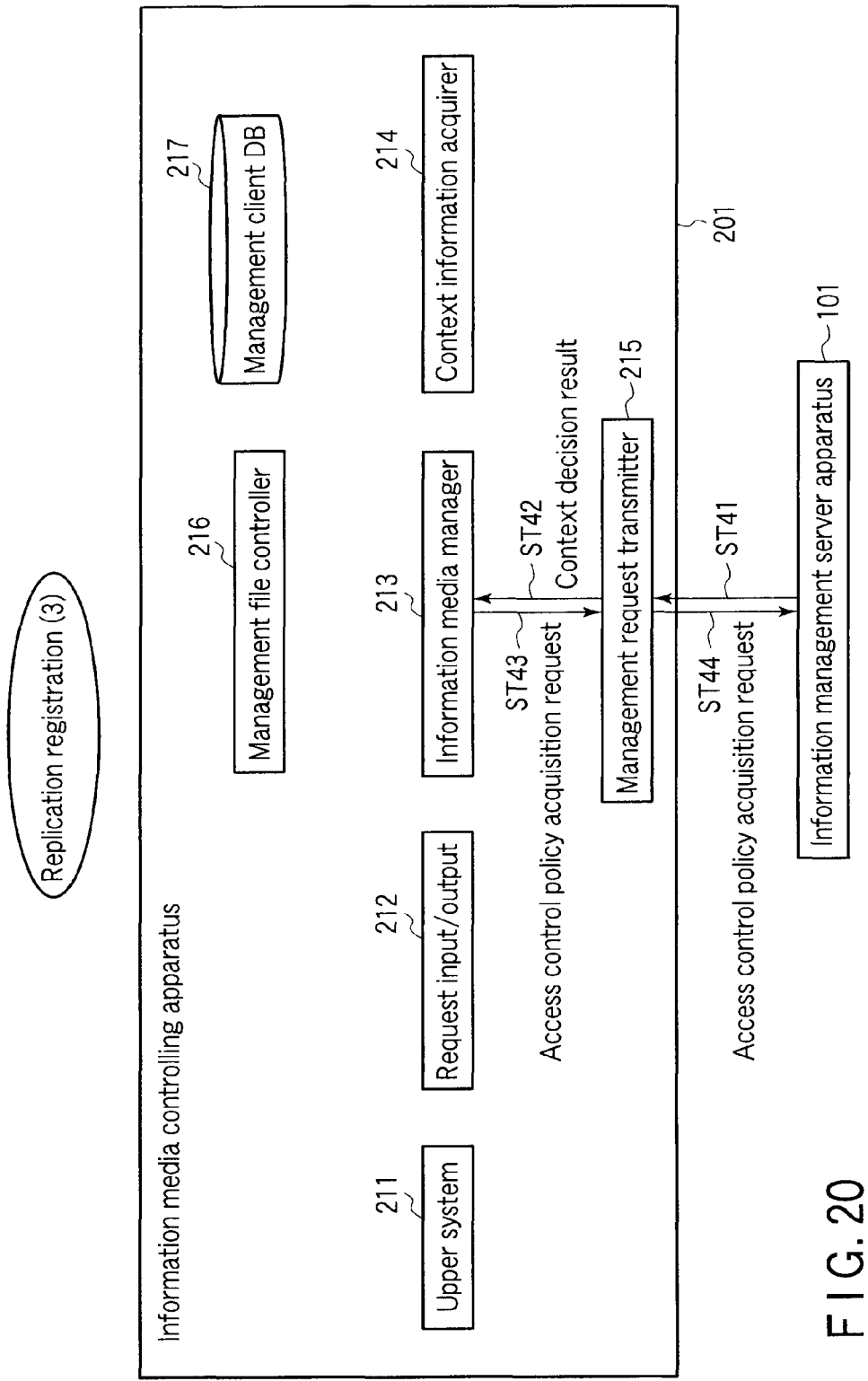
FIG. 20 is a schematic diagram for describing an operation of replication registration according to the first: embodiment.

As illustrated in FIGS. 18 to 20, the information media controlling apparatus 201 and information management server apparatus 101 execute the same processing as in S2 to ST12 in new registration processing of electronic data, and authorizes context information (ST32 to ST42).

When the context decision result indicates "error", the information media manager 213 reports "error" to the upper system 211 through the request input/output 212. When the context decision result does not indicate "error", access control policy acquisition request information is output to the management request transmitter 215 (ST43). Here, access control policy acquisition request information includes user information, parent management ID, location information, and use environment information.

The management request transmitter 215 transmits access control policy acquisition request information including a parent management ID, to the information management server apparatus 101 (ST44).

Figure 21:
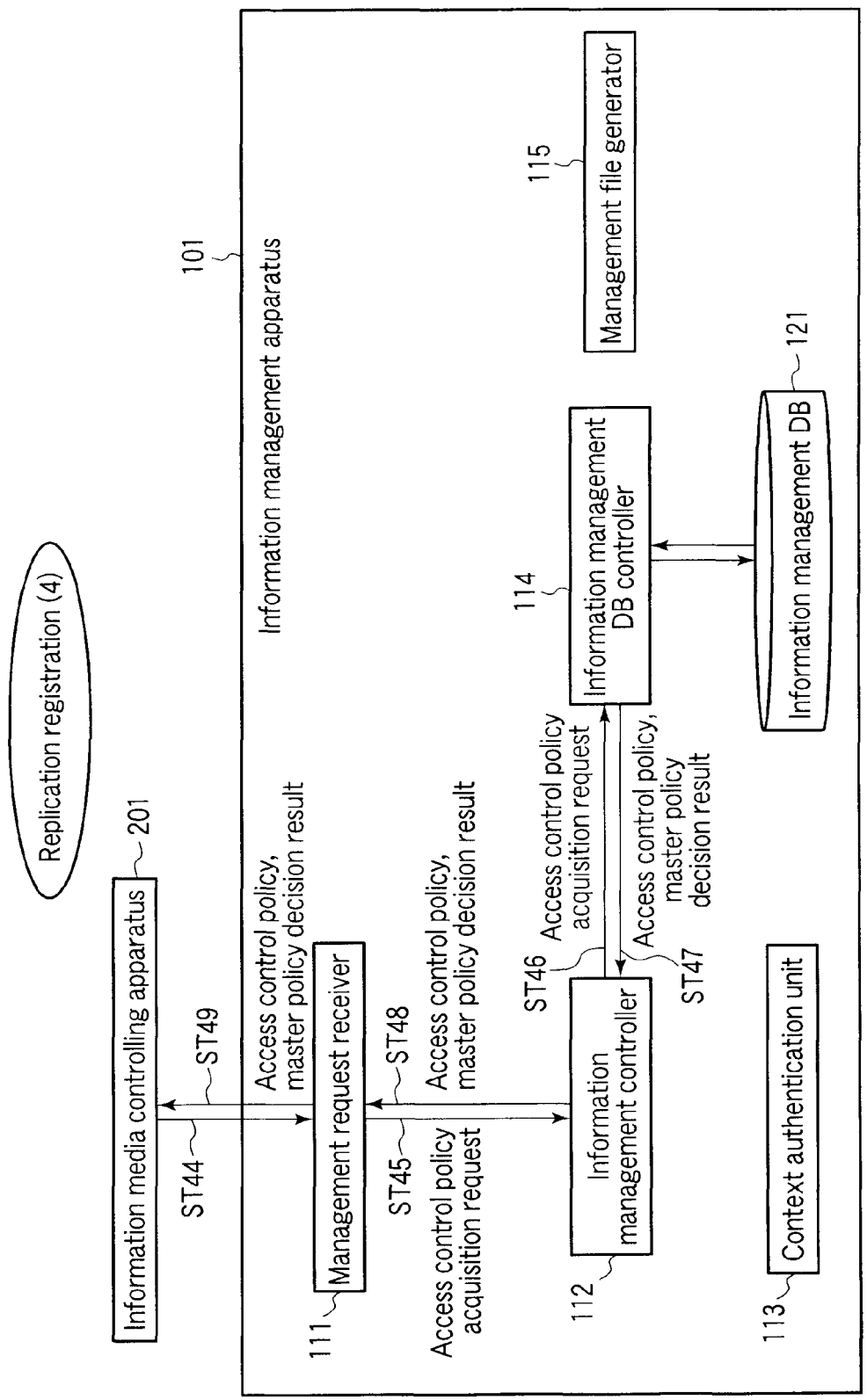
FIG. 21 is a schematic diagram for describing an operation of replication registration according to the first embodiment.

As illustrated in FIG. 21, the management request receiver 111 outputs the access control policy acquisition request information to the information management controller 112 (ST45).

The information management controller 112 outputs access control policy acquisition request information to the information management DB controller 114, and requests for an access control policy related to the parent management ID (ST46).

When receiving access control policy acquisition request information, the information management DB controller 114 cross-checks the access control policy acquisition request information and the master policy table 1215 of the information management DB 121, and decides that the access control policy can be transmitted when the cross-check result is permitted or not rejected according to the permission/rejection policy in the master policy table 1215.

According to this cross-check processing, it is decided that the access control policy can be transmitted only when user information or user environment information included in access control policy acquisition request information is permitted or not rejected according to the permission/rejection policy of the master policy table 1215, and other information such as the request receiving time is also permitted or not rejected according to the permission/rejection policy.

When it is decided that the access control policy can be transmitted, the information management DB controller 114 reads the access control policy for the parent management ID in access control policy acquisition request information, from the system management table 1212 in the information management DB 121, and outputs the access control policy and master policy decision result to the information management controller 112 (ST47).

The information management controller 112 outputs the access control policy and master policy decision result to the management request receiver 111 (ST48).

The management request receiver 111 transmits the access control policy and master policy decision result to the information media controlling apparatus 201 (ST49).

Figure 22:
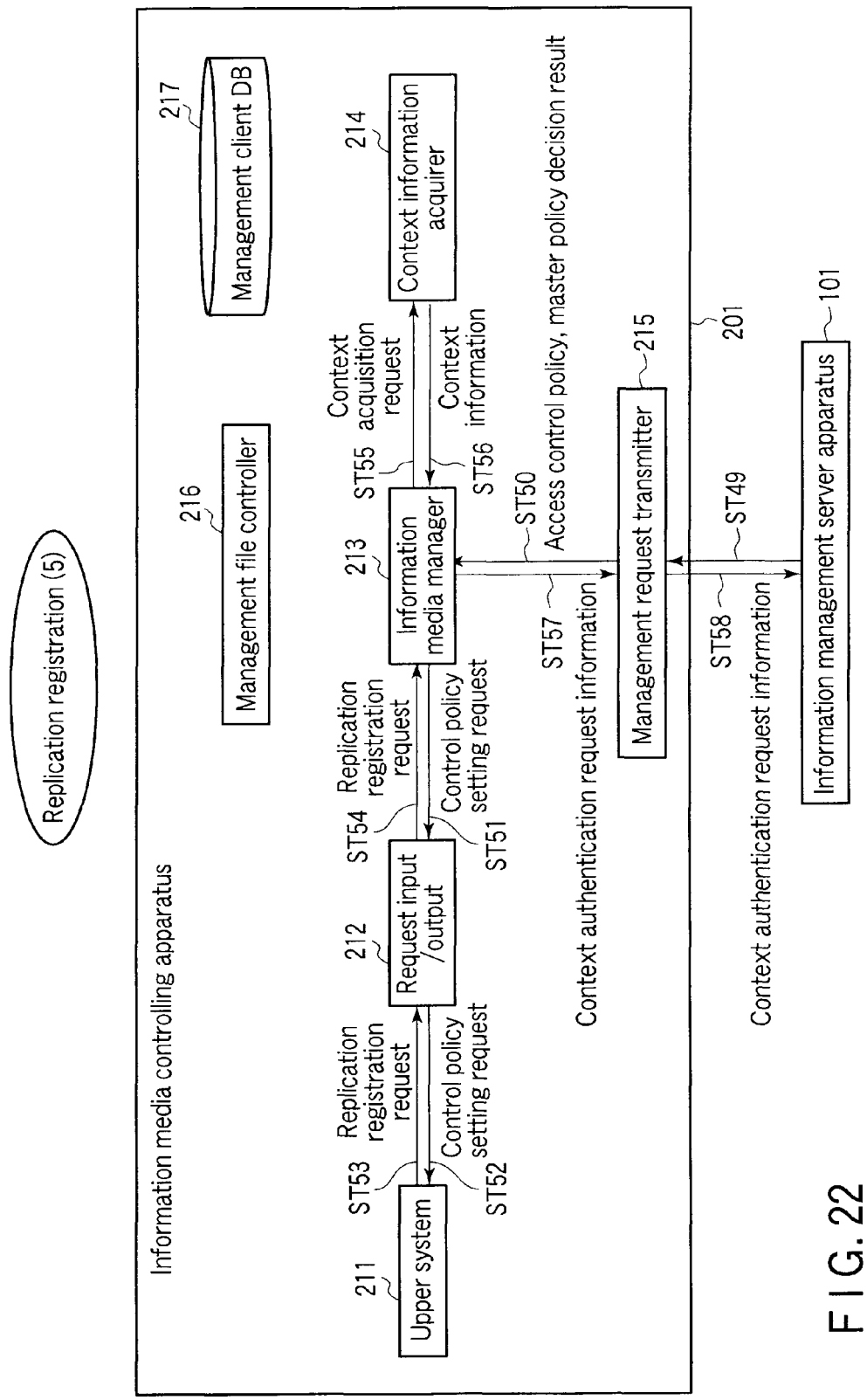
FIG. 22 is a schematic diagram for describing an operation of replication registration according to the first embodiment.

As illustrated in FIG. 22, when receiving the access control policy and master policy decision result, the management request transmitter 215 transmits a session cut request to the information management server apparatus 101, and cuts communication with the information management server apparatus 101. The management request transmitter 215 outputs the access control policy and master policy decision result to the information media manager 213 (ST50). The order of cut processing and information output processing to the information media manager 213 may be random.

The information media manager 213 cross-checks an access control policy associated with the parent management ID, user information and use environment information, and decides whether or not there is an authority to execute this replication registration processing. When there is an execution authority, the information media manager 213 outputs to the request input/output 212 an access control policy setting request for the child management file electrically replicated and derived from the electronic data main body indicated by the entity ID associated with the parent management ID (ST51).

The request input/output 212 outputs the access control policy setting request to the upper system 211 (ST52).

When receiving the access control policy setting request, the upper system 211 sets the access control policy for the child management file according to the user's operation. The access control policy for the child management file defines a system policy for setting limitation of the access control policy associated with the parent management ID. When a plurality of child management files are replicated at the same time from the electronic data main body indicated by the entity ID associated with the parent management ID, the access control policy for each child management file may all be shared, or may be set differently according to the acquisition destination of the child management files where necessary. The access control policy may not be set by the user, and may be set according to an appropriate setting program according to the situation or environment. When the access control policy is set, the upper system 211 outputs to the request input/output 212 replication registration request information including the parent management ID, acquisition destination information of the child management file, post office box ID, access control policy associated with the parent management ID, and access control policy of the child management file (ST53).

The request input/output 212 outputs replication registration request information to the information media manager 213 (ST54).

Figure 23:
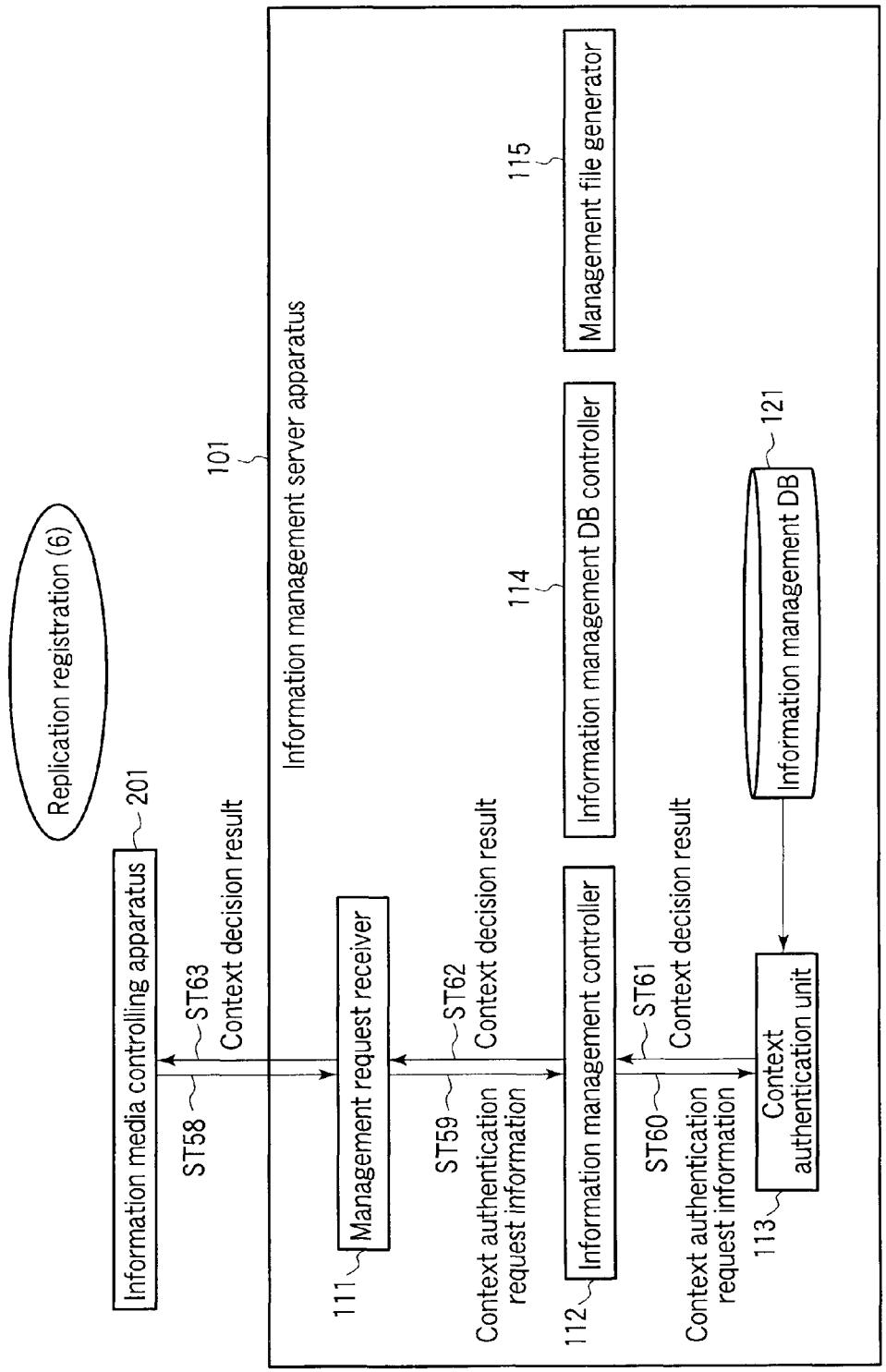
FIG. 23 is a schematic diagram for describing an operation of replication registration according to the first embodiment.

The information media manager 213 decides whether or not the access control policy of the child management file is within limitation of the access control policy associated with the parent management ID. When limitation is violated, the access control policy of the child management file is corrected again, or processing is finished by outputting "error". When limitation is not violated, as illustrated in FIGS. 22 to 24, context authentication processing is executed in the same manner as in ST33 to ST42, and a communication session is established after authorization processing with the information management server apparatus 101 (ST55 to ST64).

After that, the information media manager 213 outputs replication registration request information to the management request transmitter 215 (ST65). Incidentally, the access control policy of the parent management file included in the replication registration request information is contained in the information management server 101, and therefore may not be output.

The management request transmitter 215 transmits replication registration request information to the information management server 101 (ST66).

As illustrated in FIG. 25, the management request receiver 111 outputs replication registration request information to the information management controller 112 (ST67).

The information management controller 112 outputs the replication registration processing request including replication registration request information, to the information management DB controller 114 (ST68), and requests issuance of a child management ID based on replication registration request information and registration of management ID issue information, system information, post office box information, and access log information, in the information management DB 121.

When receiving the replication registration processing request, the information management DB controller 114 refers to the master policy table 1215 in the information management DB 121, and decides whether or not the requested replication registration processing can be executed. When the master policy is not violated, whether or not processing can be executed is decided based on items of whether or not the information media controlling apparatus 201 or the user which requests processing to the information media controlling apparatus 201 has an authority to perform replication registration under the situation or environment upon request, and whether or not the access control policy of the child management file is within limitation of the access control policy associated with the parent management ID. This decision may include decision items such as whether or not the child management file of the issuance target is within the generation range which allows derivation when the origin of the target management ID is taken into account or whether the child management file does not exceed the upper limit of the number of derivations.

As a result of the decision, only when processing can be executed, the information management DB controller 114 issues a child management ID, and registers management ID issue information including the child management ID, issue data and issue request source information in the management ID table 1211 in the information management DB 121.

Further, the information management DB controller 114 associates the child management ID with parent management ID to register them in the system management table 1212, and associates acquisition destination information of the child management file with child management ID as location information to register them in the system management table 1212.

Further, the information management DB controller 114 associates the child management ID with the post office box ID in the replication registration request information to register the child management ID in the post office box management table 1213, and writes the number of the registered child management IDs for each specified post office box, in the post office box management table 1213.

Further, the information management DB controller 114 registers access log information including the date, client ID, operation type, management ID and processing status, in the access log management table 1214 in the information management DB 121.

Incidentally, when a plurality of child management IDs are issued, the information management DB controller 114 also executes the same processing for each of the child management IDs. The information management DB controller 114 outputs replication registration processing result information including the issued child management IDs, to the information management controller 112 (ST69). The replication registration processing result information includes information to be registered in the access log table 2172 in the management client DB 217, more specifically, includes the child management ID, date and operation type, and does not include the management file name.

The information management controller 112 outputs replication registration processing result information to the management request receiver 111 (ST70).

The management request receiver 111 transmits replication registration processing result information to the information media controlling apparatus 201 as a response to the replication registration request (ST71). When processing fails, error information is transmitted.

Figure 26:
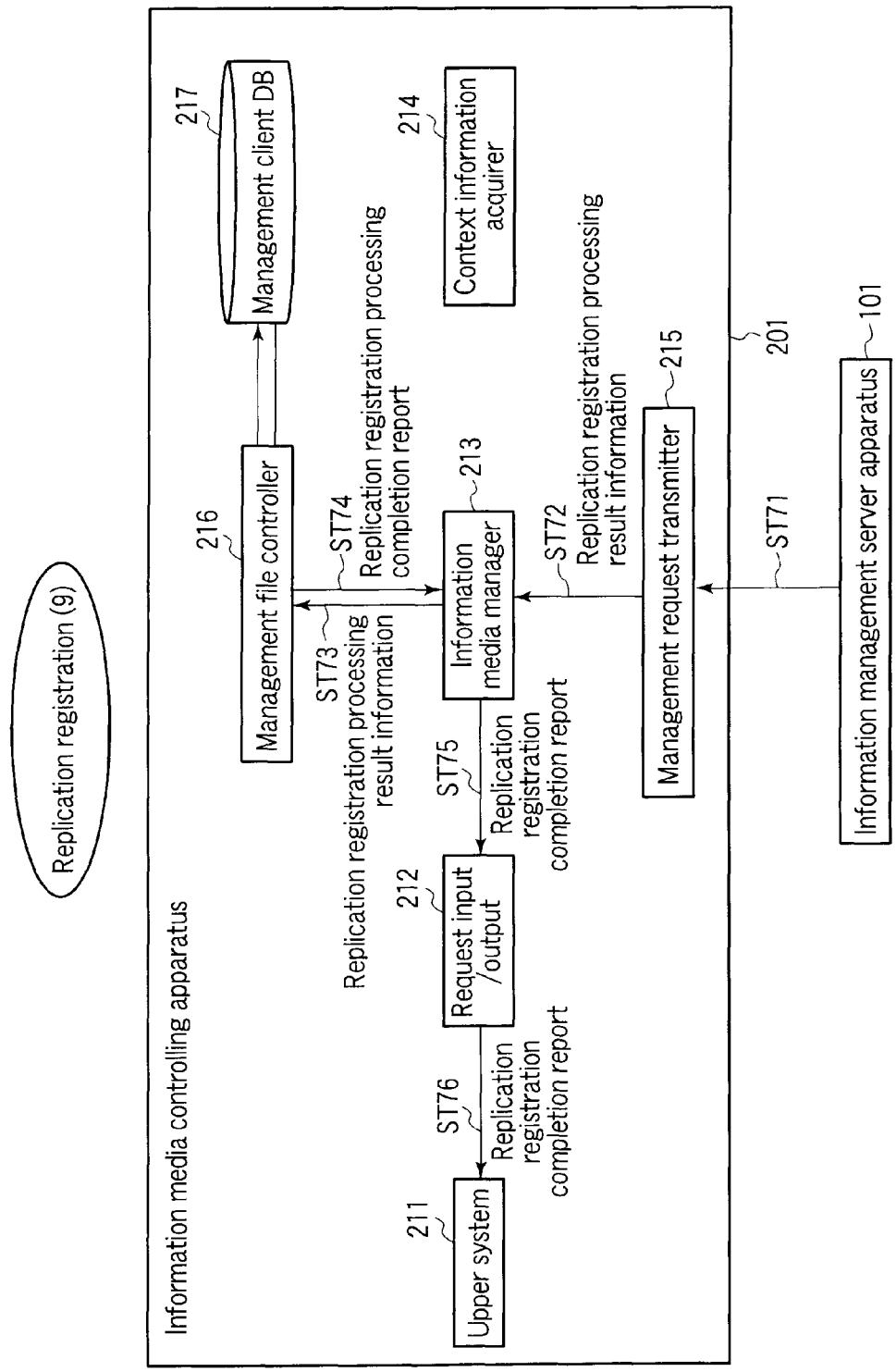
FIG. 26 is a schematic diagram for describing an operation of replication registration according to the first embodiment.

As illustrated in FIG. 26, the management request transmitter 215 outputs the received replication registration processing result information to the information media manager 213 (ST72). At the same time, the management request transmitter 215 transmits a communication session cut request to the information management server apparatus 101, and cuts communication.

The information media manager 213 outputs replication registration processing result information to the management file controller 216, and requests registration of the processing result in the management client DB 217 (ST73).

The management file controller 216 registers an operation log of replication registration including operation date information, an operation type and child management ID, in the access log table 2172 of the management client DB 217 based on replication registration processing result information.

After registration is completed, the management file controller 216 outputs a replication registration processing completion report to the information media manager 213 (ST74).

The information media manager 213 receives the replication registration processing completion report, and outputs the replication registration completion report to the request input/output 212 (ST75).

The request input/output 212 outputs the replication registration completion report to the upper system 211, and finishes a series of replication registration request sessions (ST76).

When receiving the replication registration completion report, the upper system 211 may report to the information media controlling apparatus 201 of the acquisition destination that there is replication registration of electronic data, by transmitting this replication registration completion report to the information media controlling apparatus 201 of the acquisition destination according to, for example, the operation of the operator. In this case, the upper system 211 of the information media controlling apparatus 201 of the acquisition destination can easily confirm whether or not there is replication registration for the information media controlling apparatus 201 on the occasion of the operations of the operator or confirmation setting in a time cycle. However, not being limited thereto, for example, the operator of the information media controlling apparatus 201 which performs replication registration may report that there is replication registration to the operator of the information media controlling apparatus 201 of the acquisition destination by means of any contacting method, such as oral communication, telephone, FAX or electronic mail.

(Replication Acquisition of Electronic Data: FIGS. 27 to 33)

First, the generalized operation will be given, excluding various authorizing operations.

(Generalized Operation of Replication Acquisition)

The information media controlling apparatus 201 transmits a post office box check request including a post office box ID, to the information management server apparatus 101.

When receiving the post office box check request, the information management server apparatus 101 reads a child management ID associated with a post office box ID in the post office box check request, from the post office box management table 1216, and transmits post office box confirmation information including the child management ID, to the information media controlling apparatus 201 which is the transmission source of the post office box check request.

The information media controlling apparatus 201 transmits to the information management server apparatus 101 a replication acquisition request including the child management ID associated with a management file of a replication acquisition target among the child management IDs in this post office box confirmation information.

When receiving a replication acquisition request, the information management server apparatus 101 reads an entity ID associated with the child management ID in this replication acquisition request, from the system management table 1212, reads an electronic data main body associated with this entity ID from the data original copy management table 1217, generates a child management file including the child management ID and electronic data main body, deletes this child management ID from the post office box management table 1216 and transmits the child management file to the information media controlling apparatus 201 which is the transmission source of the replication acquisition request.

The information media controlling apparatus 201 writes this child management file in the management file management table 2171.

Next, this replication acquisition operation, including various authorizing operations, will be described in detail.

(Detailed Operation of Replication Acquisition)

In this system, when the information media controlling apparatus 201 acquires replicated electronic data for the information media controlling apparatus 201, from the information management server apparatus 101, the information media controlling apparatus 201 and information management server apparatus 101 execute the following processing. In addition, the information media controlling apparatus 201 which executes replication acquisition processing is assumed to be a different apparatus from the information media controlling apparatus 201 which executes the above replication registration processing.

Figure 27:
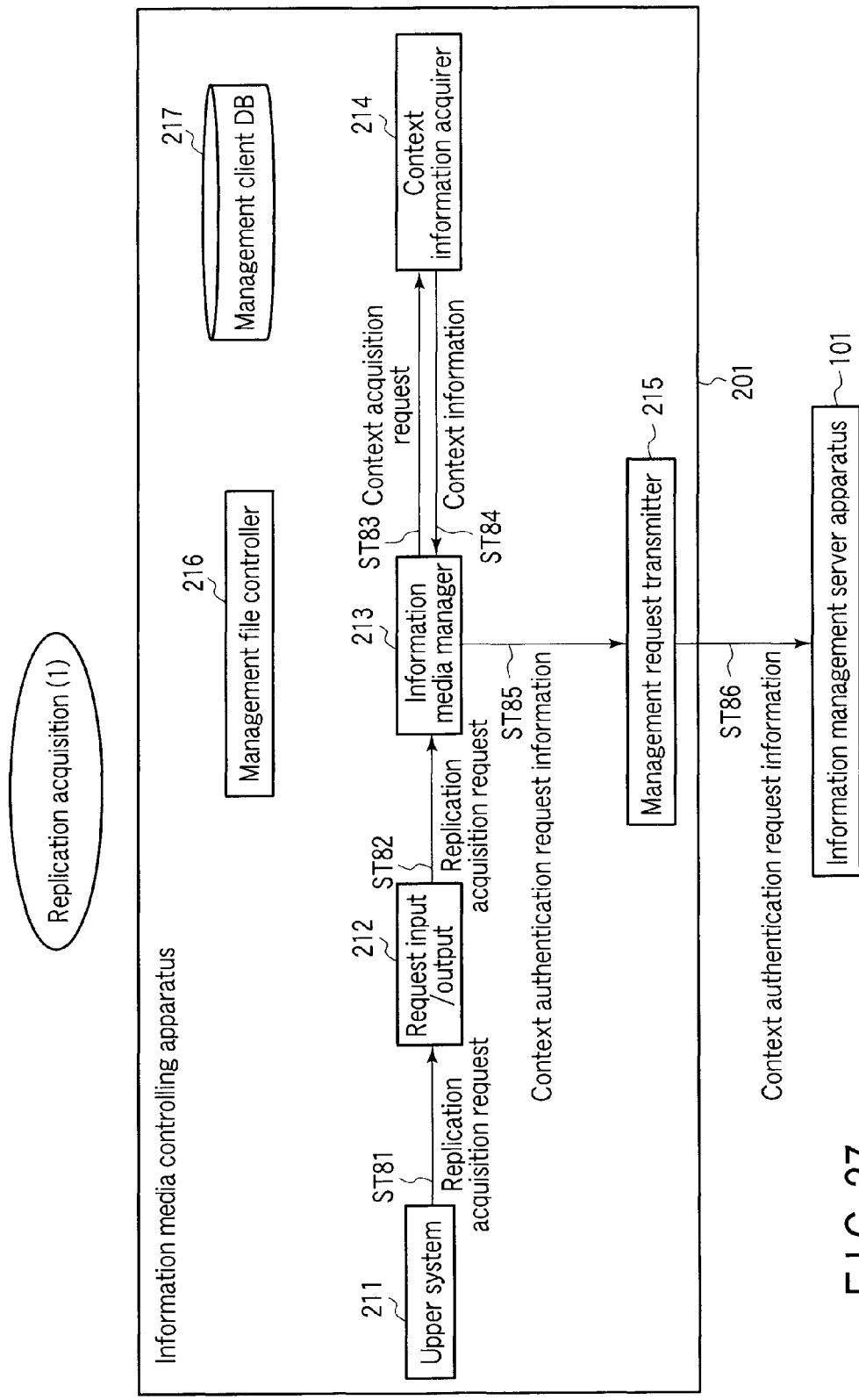
FIG. 27 is a schematic diagram for describing an operation of replication acquisition according to the first embodiment.

As illustrated in FIG. 27, the upper system 211 confirms whether or not there is replication registration for the information media controlling apparatus 201, on the occasion of the operation of the operator or confirmation setting in the time cycle, and outputs to the request input/output 212 an acquisition request (hereinafter, "replication acquisition request) of replicated and registered electronic data if there is replication registration (ST81). The replication acquisition request includes user information of the user which makes an acquisition request. This replication acquisition request may include location information or use environment information of the information media controlling apparatus 201, or may include a post office box ID associated with the information media controlling apparatus 201.

The request input/output 212 outputs the replication acquisition request to the information media manager 213 (ST82).

Figure 28:
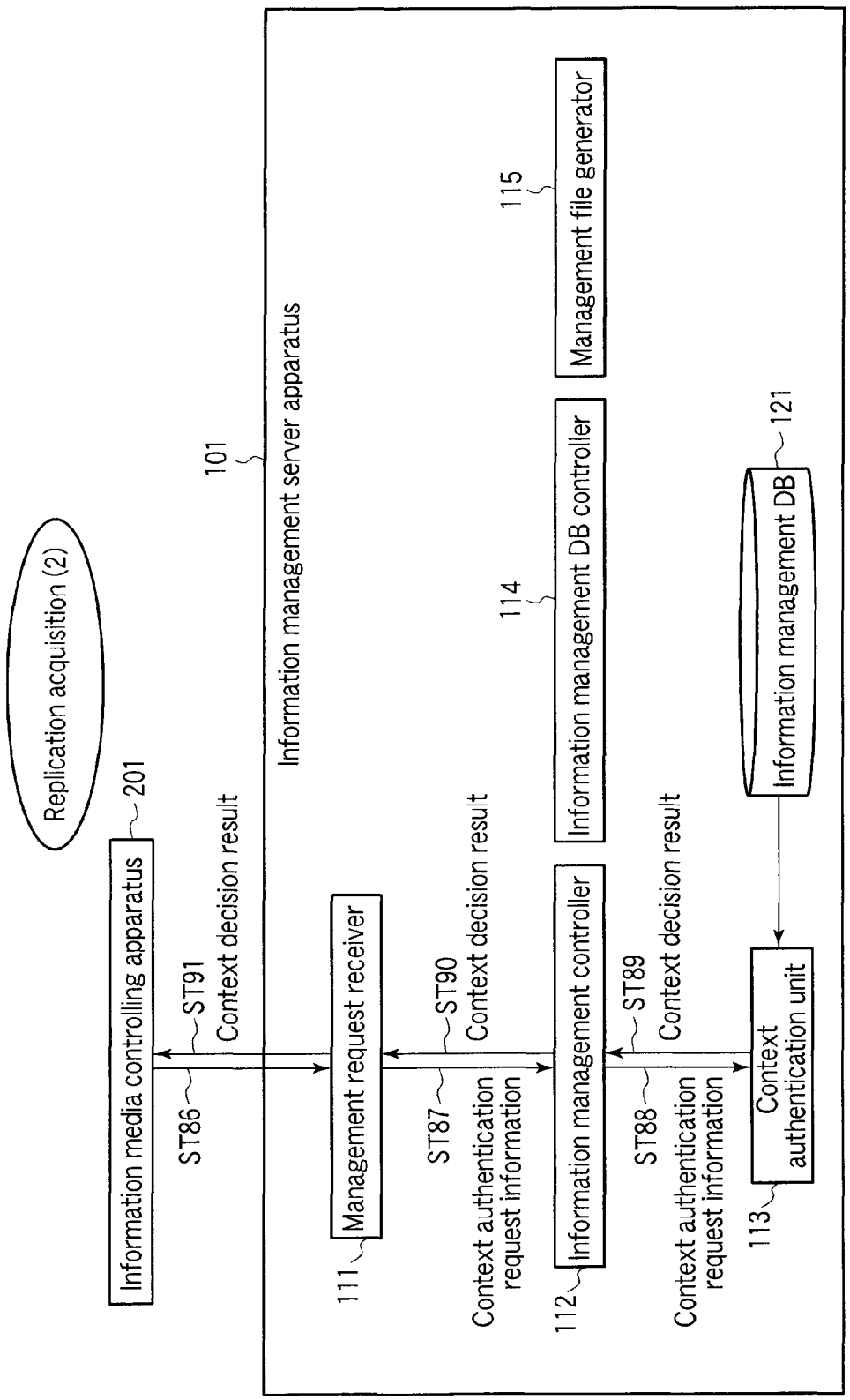
FIG. 28 is a schematic diagram for describing an operation of replication acquisition according to the first embodiment.
Figure 29:
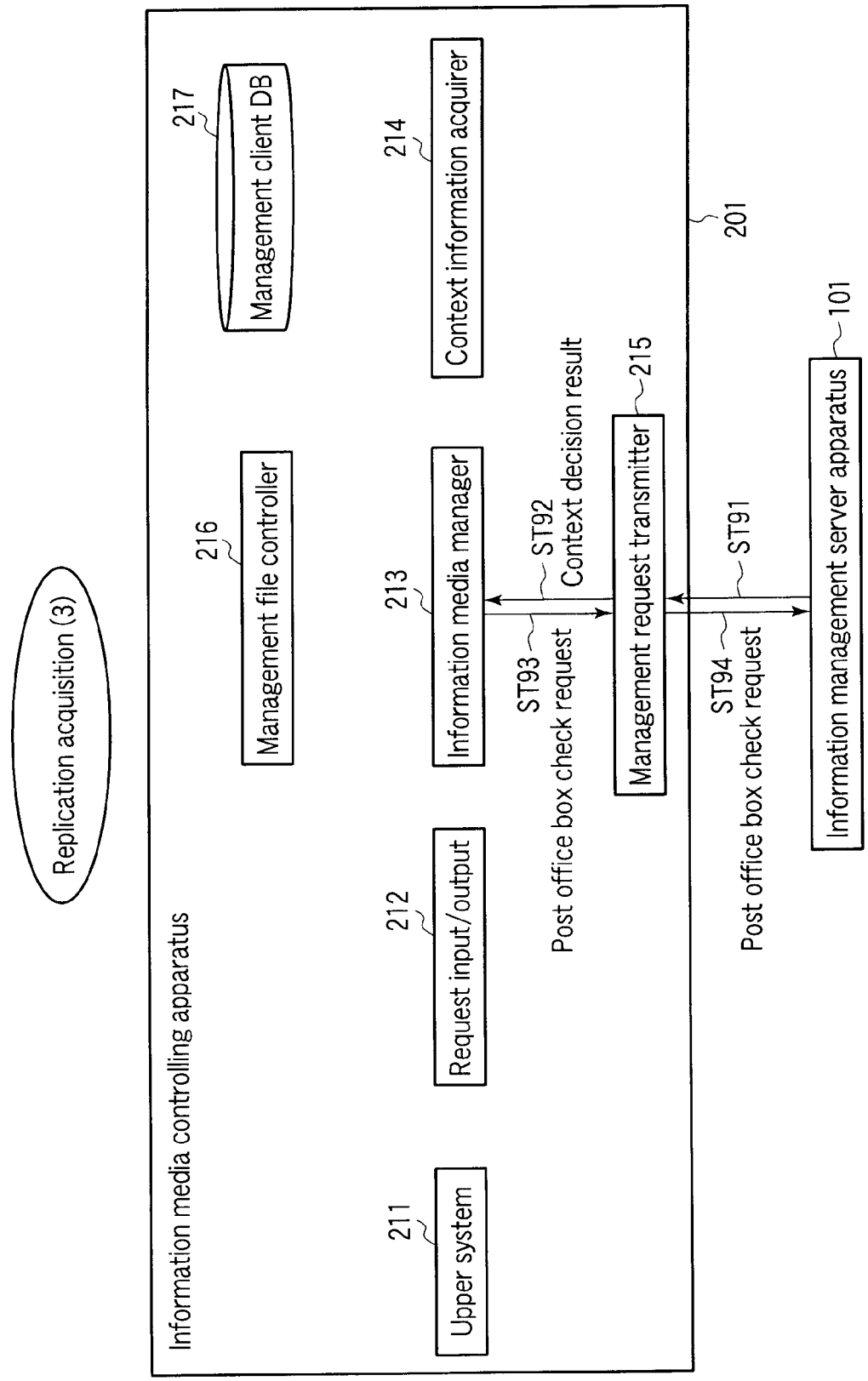
FIG. 29 is a schematic diagram for describing an operation of replication acquisition according to the first embodiment.

As illustrated in FIGS. 27 to 29, the information media controlling apparatus 201 and information management server apparatus 101 execute the same processing as in ST3 to ST12 of new registration of electronic data, and authorizes context information (ST83 to ST92).

When the context decision result indicates "error", the information media manager 213 reports "error" to the upper system 211 through the request input/output 212. When the context decision result does not indicate "error", the post office box check request including the post office box ID of the post office box in which replication acquisition information of electronic data needs to be confirmed is output to the management request transmitter 215 (ST93). Post office box check processing may be realized by a system configuration of receiving a request only for a post office box assigned only to the information media controlling apparatus 201. A system configuration may also be realized which receives a post office box check according to a specified post office box ID for any post office box.

The management request transmitter 215 transmits a post office box check request to the information management server apparatus 101 (ST94).

As illustrated in FIG. 30, the management request receiver 111 outputs a post office box check request to the information management controller 112 (ST95).

The information management controller 112 outputs a post office box check request to the information management DB controller 114, and requests processing of confirming the post office box state for the specified post office box ID (ST96).

The information management DB controller 114 extracts a post office box ID from the post office box check request, and acquires post office box confirmation information including the post office box ID, the number of postings and management ID list, from the post office box management table 1216 of the information management DB 121. The number of postings is the number of replicated and registered management IDs, and is the number of management files which can be replicated and acquired. The information management DB controller 114 outputs the acquired post office box confirmation information to the information management controller 112 (ST97).

The information management controller 112 outputs post office box confirmation information to the management request receiver 111 (ST98).

The management request receiver 111 transmits post office box confirmation information to the information media controlling apparatus 201 (ST99).

Figure 31:
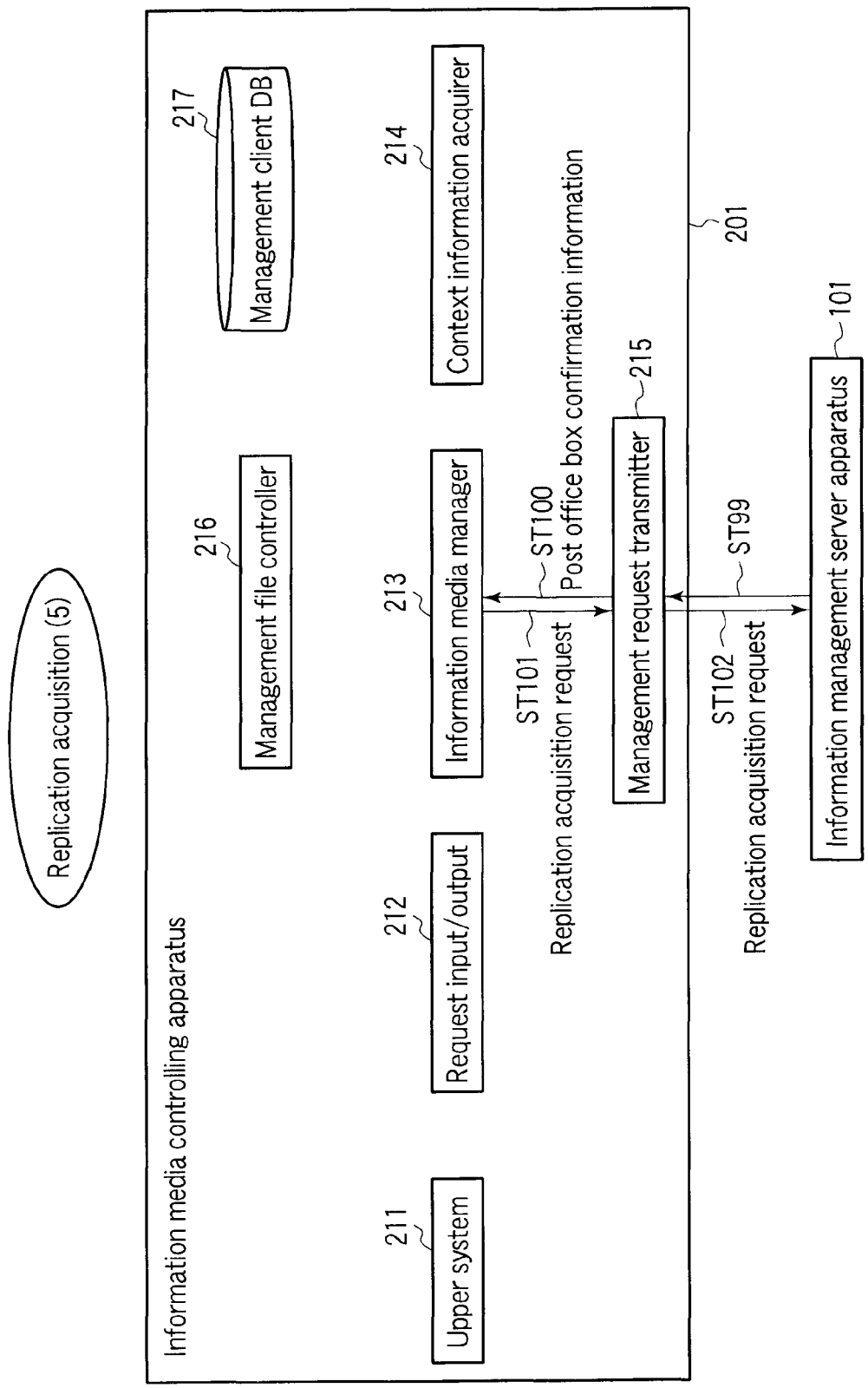
FIG. 31 is a schematic diagram for describing an operation of replication acquisition according to the first embodiment.

As illustrated in FIG. 31, the management request transmitter 215 outputs post office box confirmation information to the information media manager 213 (ST100).

The information media manager 213 confirms whether or not there is a management file which can be replicated and acquired, based on the number of postings or management ID list in the post office box confirmation information. When there is no management file which can be acquired, this replication acquisition processing is finished. At this time, the information media manager 213 may request the management file controller 216 to write access log information in the management client DB 217. Further, the information media manager 213 may report to the upper system 211 through the request input/output 212 that there is no management file. When there is a management file which can be acquired, a management ID of a management file to acquire is selected from the management ID list in post office box confirmation information, and a replication acquisition request including this management ID is output to the management request transmitter 215 (ST101).

The management request transmitter 215 transmits replication acquisition request information to the information management server 101 (ST102).

Figure 32:
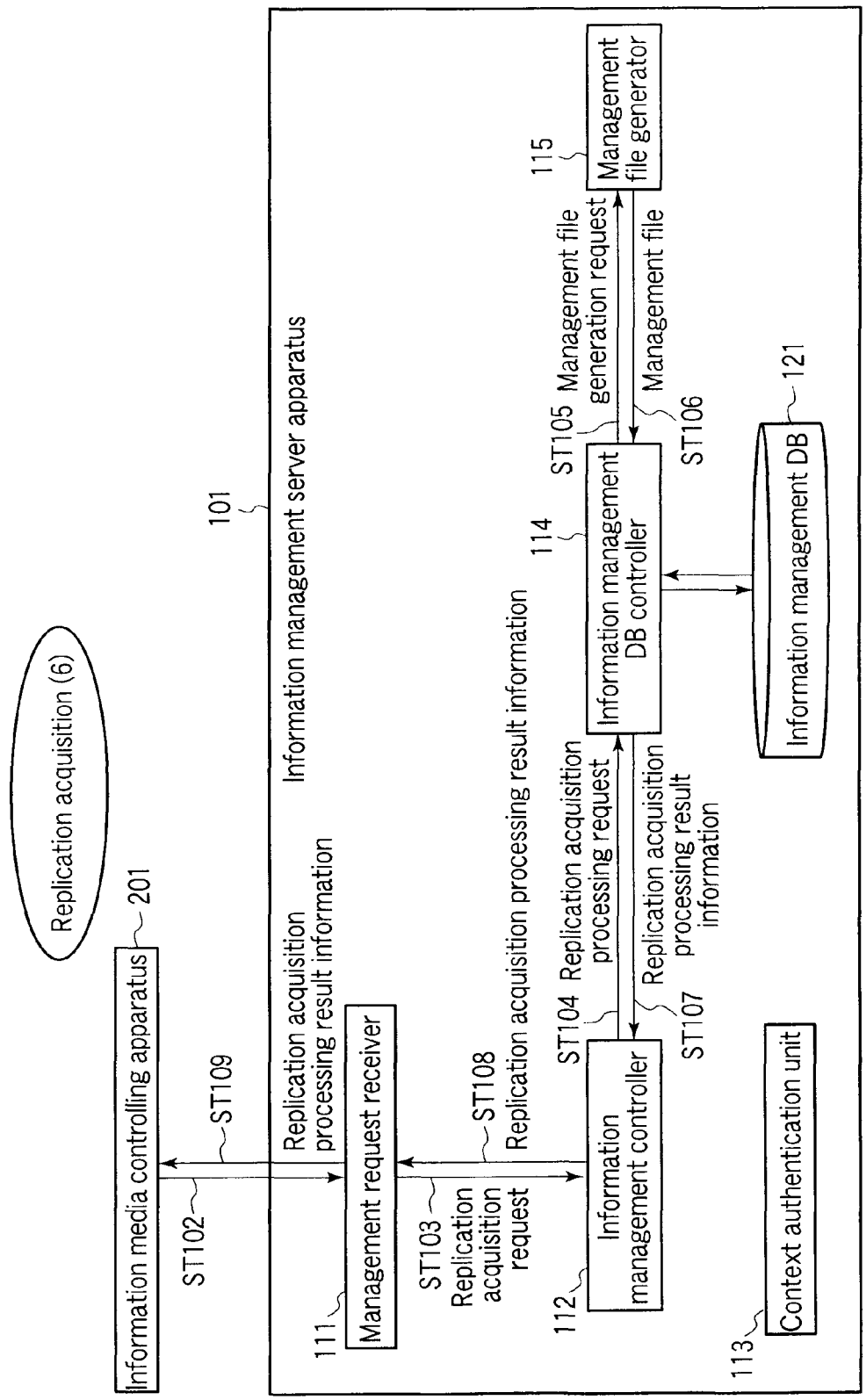
FIG. 32 is a schematic diagram for describing an operation of replication acquisition according to the first embodiment.

As illustrated in FIG. 32, the management request receiver 111 outputs replication acquisition request information to the information management controller 112 (ST103).

The information management controller 112 outputs replication acquisition processing request information including replication acquisition request information and the context decision result, and requests that the information management DB controller 114 performs replication acquisition processing including generation of management files and registration of the parent-child relationship in the information management DB 121 (ST104).

When receiving replication acquisition processing request information, the information management DB controller 114 cross-checks replication acquisition processing request information and the master policy table 1215 of the information management DB 121, and proceeds to processing of a management file generation request of a replication acquisition target as long as the cross-check result is permitted or not rejected according to the permission/rejection policy in the master policy table 1215. Incidentally, cross-check processing is executed as described above.

When processing proceeds to processing of a management file generation request, the information management DB controller 114 acquires information required to generate a management file from the information management DB 121, and outputs a management file generation request including this information, to the management file generator 115 (ST105). Here, information required to generate a management file includes a management ID which is a replication acquisition target, an electronic data main body of a management target associated with the management ID, and an access control policy associated with the management ID. The management ID and access control policy are acquired from, for example, the system management table 1212 in the information management DB 121. Further, electronic data main body is acquired from the data original copy management table 1217 in the information management DB 121.

Next, when receiving the management file generation request including the management ID of a replication acquisition target, electronic data main body and access control policy, the management file generator 115 generates a management file based on this management file generation request. The management file generation procedure is, for example, as follows.

The management file generator 115 sets a management ID in a management ID area of electronic data of the header part. NULL is set to the management ID of the parent information media of the header part. In file information of the header part, the file format, file size, creator information, creation date information and creation location information are set.

The management file generator 115 sets file storage information of the header part based on whether or not encryption processing is performed and the specification of encryption processing such as the cryptographic algorithm, cryptographic key, and cryptographic module. Here, encryption processing can be specified in various modes. For example, where the upper system 211 specifies encryption processing according to replication acquisition request information, the information media manager 213 specifies encryption processing according to replication acquisition management request information, or the information management DB controller 114 specifies encryption processing according to the management file generation request.

Further, the management file generator 115 sets file storage information, an access control policy, and information management server information, in the header part. Accordingly, the header part is generated.

Then, the management file generator 115 applies encryption processing to electronic data based on file storage information of the header part, and sets this acquired encrypted electronic data in the body part. Accordingly, the body part is generated.

The management file generator 115 generates, for this generated header part and body part, authentication data according to the digital signature scheme based on public key cryptosystem or the MAC scheme based on a hush function or symmetric key cryptosystem. This authentication data is set in the authentication data part of the management file. Accordingly, the management file is created.

The management file generator 115 outputs the created management file to the information management DB controller 114.

When receiving a management file, the information management DB controller 114 associates the management file with the management ID of electronic data based on the management file, management ID and replication acquisition processing request information, and registers system information including creation date information, creator information, media type, access control policy, location information and entity ID, in the system management table 1212 in the information management DB 121. Here, the management ID of electronic data is associated with the management ID of the parent information media when the management ID of the parent information media is present, and registered in the system management table 1212.

Figure 2:
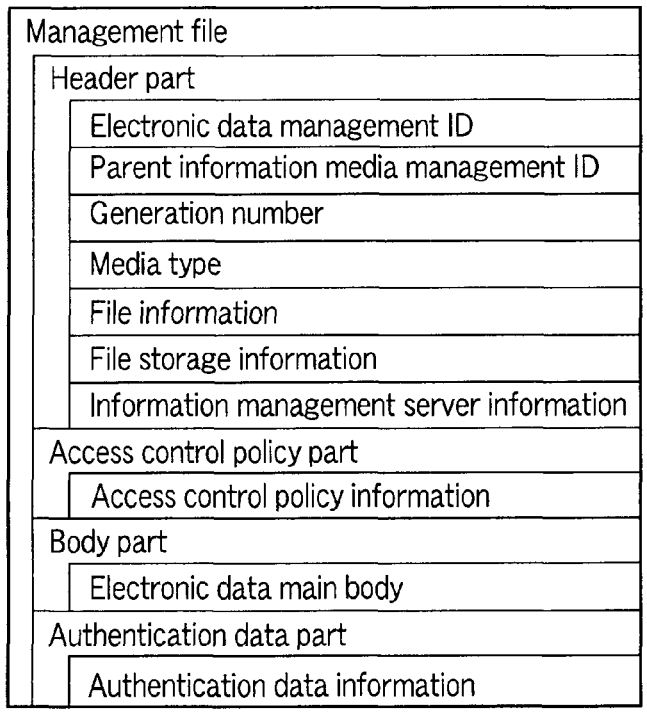
FIG. 2 is a configuration example of a management file in this system.

Further, when there are a plurality of target management IDs, management file generation processing is performed a number of times corresponding to the number of management IDs. The configuration example of the management file is as illustrated in FIG. 2. The management file generator 115 outputs the generated management file to the information management DB controller 114 (ST106).

When receiving the management file, the information management DB controller 114 executes processing of registering access log information related to management file generation processing in the access log management table 1214 of the information management DB 121, and executes processing of clearing the number of postings and management ID list associated with the post office box ID of the post office box management table 1213. After that, the information management DB controller 114 outputs to the information management controller 112 replication acquisition processing result information including the issued management ID, management file, date and operation type (ST107).

The information management controller 112 outputs replication acquisition processing result information to the management request receiver 111 (ST108).

The management request receiver 111 transmits replication acquisition processing result information to the information media controlling apparatus 201 (ST109). When processing fails, error information is transmitted.

Figure 33:
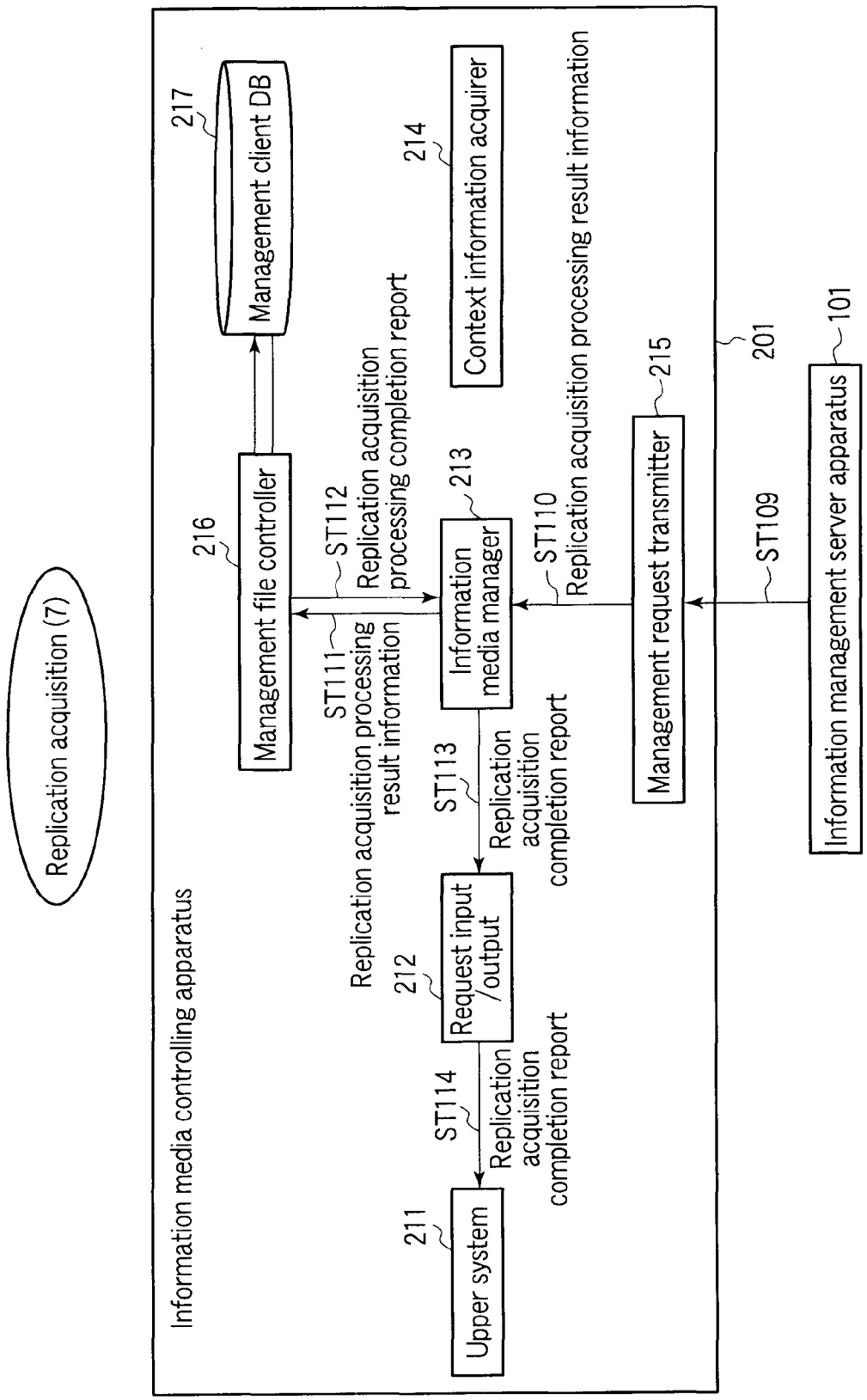
FIG. 33 is a schematic diagram for describing an operation of replication acquisition according to the first embodiment.

As illustrated in FIG. 33, the management request transmitter 215 outputs the received replication acquisition processing result information to the information media manager 213 (ST110). At the same time, the management request transmitter 215 transmits a communication session cut request to the information management server apparatus 101, and cuts communication.

The information media manager 213 outputs replication acquisition processing result information to the management file controller 216, and requests that the processing result is registered in the management client DB 217 (ST111).

The management file controller 216 registers the management ID, status, management file header partial information and management file entity in the management file management table 2171, as described above based on replication acquisition processing result information.

Similarly, the management file controller 216 registers an operation log of replication acquisition processing including operation date information, operation type, management ID and management file name, in the access log table 2172.

After registration is completed, the management file controller 216 outputs a replication acquisition processing completion report to the information media manager 213 (ST112). The replication acquisition processing completion report may include the management ID issued for this electronic data.

The information media manager 213 outputs a replication acquisition processing completion report to the request input/output 212 (ST113).

The request input/output 212 outputs a replication acquisition completion report to the upper system 211, and finishes this request session (ST114).

As described above, according to the present embodiment, even when the information media controlling apparatus 201 which requests replication registration of electronic data and the information media controlling apparatus 201 which acquires a child management file generated by replication registration are separate apparatuses, the information management server apparatus 101 registers a child management ID of electronic data and a post office box ID of the acquisition destination of a child management file, in the post office box management table 1216 based on replication registration request information received from one information media controlling apparatus 201, and has the other information media controlling apparatus 201 which is the acquisition destination acquire the child management file based on the post office box management table 1216. Consequently, even when a client which requests replication of a management file needs to pass a child management file to another client, it is possible to manage an information life cycle of the child management file.

Second Embodiment

FIG. 34 is a schematic diagram illustrating a configuration of an information life cycle management system according to a second embodiment of the present invention, and the same units as in FIG. 3 will be assigned the same reference numerals and detailed description thereof will be omitted, and different parts will be mainly described. Incidentally, overlapping description will be omitted in the following embodiment in the same manner.

The present embodiment is a modified example of the first embodiment, and, with the present embodiment, a post office box is regularly and automatically checked and an information media controlling apparatus 201 illustrated in FIG. 3 employs a configuration including a post office box controller 218.

Here, the post office box check controller 218 has a function of regularly outputting a post office box check request including a post office box ID to a request input/output 212 when a predetermined condition is satisfied.

Next, an operation of the information life cycle management system employing the above configuration will be described.

The post office box check controller 218 outputs the post office box check request for the specified post office box, to the request input/output 212 in a time cycle or under a predetermined condition.

The request input/output 212 outputs this post office box check request to the information media manager 213, acquires a post office box confirmation result from the information media manager 213 through processing of ST93 to ST100, and then outputs this post office box confirmation result to the post office box check controller 218.

When, in a target post office box, there is a management file which can be acquired, the post office box check controller 218 outputs to the request input/output 212 a replication acquisition possibility report that there is a management file which can be acquired, based on the post office box confirmation result.

The request input/output 212 outputs the replication acquisition possibility report to the upper system 211, and triggers replication acquisition processing.

As described above, according to the present embodiment, in addition to the effect of the first embodiment, the configuration including the post office box check controller 218 which regularly outputs a post office box check request to the request input/output 212 allows the upper system 211 to more quickly acquire a replicated management file.

Third Embodiment

FIG. 35 is a schematic diagram illustrating a configuration of an information life cycle management system according to a third embodiment of the present invention.

The present embodiment is a modified example of the first embodiment, and, with the present embodiment, an information management server apparatus 101 actively requests acquisition of a management file associated with the post office box and staying in an information media controlling apparatus 201, based on the number of postings in the post office box or the number of staying days and the information management server apparatus 101 illustrated in FIG. 3 employs a configuration including a post office box confirmation requester 116.

The post office box confirmation requester 218 has a function of regularly outputting a post office box check request including a post office box ID, to a request input/output 212 when a predetermined condition is satisfied.

Next, an operation of the information life cycle management system employing the above configuration will be described.

The post office box confirmation requester 116 outputs a post office box check request for a specified post office box, to a management request receiver 111 in a time cycle or under a specified condition. The management request receiver 111 acquires post office box confirmation information through processing of ST95 to ST98, and outputs this post office box confirmation information to the post office box confirmation requester 116.

The post office box confirmation requester 116 confirms post office box stay information such as the number of postings in a post office box and the number of staying days in the post office box, and, when a predetermined condition is satisfied, transmits a post office box confirmation request such that the information media controlling apparatus 201 checks the post office box, to the information media controlling apparatus 201 which is the acquisition destination of the child management file through the management request receiver 111. A prescribed condition includes a case where the number of postings in the post office box exceeds 10 or a case where the number of staying days in the post office box exceeds 30 days. The prescribed condition is not limited to this. For example, replication registration processing may be performed by monitoring the management request receiver 111, and, at the same time as a child management ID is received, transmitting a post office box confirmation request through the management request receiver 111 such that the post office box is checked, to the information media controlling apparatus 201 which is the acquisition destination of the child management file.

As described above, according to the present embodiment, in addition to the effect of the first embodiment, the configuration including the post office box requester 116 which regularly outputs a post office box check request to the management request receiver 111 allows the information media controlling apparatus 201 to more quickly acquire a replicated management file.

The method described in the embodiment can also be stored in a storage medium such as a magnetic disk (Floppy™ disk, hard disk, or the like), an optical disk (CD-ROM, DVD, or the like), a magneto-optical disk (MO), or a semiconductor memory as a program which can be executed by a computer and distributed.

As the storage medium, any configuration which is a computer-readable storage medium in which a program can be stored may be used regardless of a storage format.

An OS (operating system) which operates on a computer on the basis of an instruction of a program installed from the storage medium in the computer, database management software, and MW (middleware) such as network software may execute a part of the processes to realize the embodiment.

Furthermore, the storage medium according to the present invention includes not only a medium independent of a computer but also a storage medium in which a program transmitted through a LAN, the Internet, or the like is downloaded and stored or temporarily stored.

The number of storage media is not limited to one. A case in which the process in the embodiment is executed from a plurality of media is included in the storage medium according to the present invention. Any medium configuration may be used.

A computer according to the present invention is to execute the processes in the embodiments on the basis of the program stored in a storage medium. The computer may have any configuration such as one apparatus constituted by a personal computer or a system in which a plurality of apparatuses are connected by a network.

A computer in the present invention includes not only a personal computer but also an arithmetic processing apparatus, a microcomputer, or the like included in an information processing apparatus. The computer is a generic name of an apparatus and a device which can realize the functions of the present invention by a program.

Incidentally, the present invention is not limited to the above embodiments as is, and can be embodied within a range where components are modified without deviating from the spirit of the present invention at the implementation stage. For example, the timing to convert the electronic data in a case where the information medium is electronic data, into an electronic file management file of a file format including a management ID in the information management server apparatus 101 may not come upon new registration and upon replication registration and may come upon replication acquisition, or a management file may be created before replication acquisition is requested. Furthermore, if a client of a transmission destination can be predicted in advance at the stage where new registration is executed, a management file may be converted before replication registration or replication acquisition.

Further, various embodiments of the invention can be made by adequately combining a plurality of components disclosed in the above embodiments. For example, some components may be removed from all components disclosed in the embodiments. Furthermore, components between different embodiments may be adequately combined.

What is claimed is:

1. An information life cycle management system which comprises:
a plurality of information media controlling apparatuses that communicate with each other; and an information management server apparatus, wherein at least one of the information media controlling apparatus includes a management file management table storing unit which stores a management file management table in which a child management file including a management ID and an electronic data main body is written, a unit which transmits new registration request information including an electronic data main body of a management target, to the information management server apparatus, which includes a unit which, when receiving the new registration request information, issues a management ID and an entity ID for the electronic data main body, based on the new registration request information, registers the management ID and the entity ID, in association with each other, in a system management table stored in a system management table storing unit, and registers the entity ID and the electronic data main body in a data original copy management table stored in a data original copy management table storing unit, a unit which transmits replication registration request information including a management ID associated with electronic data of a replication registration target and a post office box ID associated with an information media controlling apparatus of a replication acquisition destination, to the information management server apparatus, which includes a unit which, when the receiving replication registration request information, issues a child management ID different from the management ID in the replication registration request information, associates the child management ID with the management ID in the replication registration request information, from among management IDs written in the system management table and registers the issued child management ID in the system management table, associates the child management ID with the post office box ID in the replication registration request information to register the child management ID and the post office box ID in a post office box management table stored in a post office box management table storing unit, and transmits replication registration processing result information including the child management ID to the information media controlling apparatus, a unit which transmits a post office box check request including the post office box ID to the information management server apparatus, which includes a unit which, when receiving the post office box check request, reads the child management ID associated with the post office box ID in the post office box check request, from the post office box management table, and transmits post office box confirmation information including at least the child management ID, to the information media controlling apparatus, a unit which, when receiving the post office box confirmation information including the child management ID associated with the post office box ID in the post office box check request from the information management server apparatus by transmitting the post office box check request, transmits a replication acquisition request including a child management ID associated with a management file of a replication acquisition target from among child management IDs in the post office box confirmation information, to the information management server apparatus, which includes a unit which, when receiving the replication acquisition request, reads an entity ID associated with the child management ID in the replication acquisition request, from the system management table, reads an electronic data main body associated with the entity ID from the data original copy management table, generates a child management file including the child management ID and the electronic data main body, deletes the child management ID from the post office box management table, and transmits the child management file to the information media controlling apparatus, and a unit which, when receiving the child management file including the child management ID in the replication acquisition request from the information management server apparatus by transmitting the replication acquisition request, writes the child management file in the management file management table.

2. An information management server apparatus which communicates individually with a plurality of information media controlling apparatuses, the information management server apparatus comprising:

a system management table storing unit which stores a system management table in which at least one association between a management ID and an entity ID and at least one association between a child management ID and the management ID are written;

a data original copy management table storing unit which stores a data original copy management table in which at least one entity ID and at least one electronic data main body are written;

a post office box management table storing unit which stores a post office box management table in which at least one association between a post office box ID and a child management ID is written;

a unit which, when receiving new registration request information including an electronic data main body of a management target, from at least one of the plurality of information media controlling apparatuses, issues a management ID and an entity ID for the electronic data main body, based on the new registration request information, registers the management ID and the entity ID in association with each other in the system management table, and registers the entity ID and the electronic data main body in the data original copy management table;

a unit which, when receiving replication registration request information including a management ID associated with electronic data of a replication registration target and a post office box ID associated with an information media controlling apparatus of a replication acquisition destination, from at least one of the plurality of information media controlling apparatuses, issues a child management ID different from the management ID in the replication registration request information, associates the child management ID with the management ID in the replication registration request information, from among management IDs in the system management table and registers the issued child management ID in the system management table, associates the child management ID with the post office box ID in the replication registration request information to register the child management ID and the post office box ID in the post office box management table, and transmits replication registration processing result information including the child management ID to the at least one information media controlling apparatus that transmits the replication registration request information;

a unit which, when receiving a post office box check request including the post office box ID from at least one of the plurality of information media controlling apparatuses, reads the child management ID associated with the post office box ID in the post office box check request, from the post office box management table, and transmits post office box confirmation information including at least the child management ID, to the at least one information media controlling apparatus which transmits the post office box check request; and a unit which, when receiving a replication acquisition request including a child management ID associated with a management file of a replication acquisition target from among child management IDs in the post office box confirmation information, from at least one of the plurality of information media controlling apparatuses, reads an entity ID associated with the child management ID in the replication acquisition request, from the system management table, reads an electronic data main body associated with the entity ID from the data original copy management table, generates a child management file including the child management ID and the electronic data main body, deletes the child management ID from the post office box management table, and transmits the child management file to the at least one information media controlling apparatus which transmits the replication acquisition request.

3. An information media controlling apparatus which communicates with an information management server apparatus, the information media controlling apparatus comprising:

a management file management table storing unit which stores a management file management table in which a child management file including a management ID and an electronic data main body is written;

a unit which transmits new registration request information including an electronic data main body of a management target, to the information management server apparatus, which includes a unit which, when receiving the new registration request information, issues a management ID and an entity ID for the electronic data main body, based on the new registration request information, registers the management ID and the entity ID, in association with each other, in a system management table stored in a system management table storing unit, and registers the entity ID and the electronic data main body in a data original copy management table stored in a data original copy management table storing unit;

a unit which transmits replication registration request information including a management ID associated with electronic data of a replication registration target and a post office box ID associated with an information media controlling apparatus of a replication acquisition destination, to the information management server apparatus, which includes a unit which, when the receiving replication registration request information, issues a child management ID different from the management ID in the replication registration request information, associates the child management ID with the management ID in the replication registration request information, from among management IDs written in the system management table and registers the issued child management ID in the system management table, associates the child management ID with the post office box ID in the replication registration request information to register the child management ID and the post office box ID in a post office box management table stored in a post office box management table storing unit, and transmits replication registration processing result information including the child management ID to the information media controlling apparatus;

a unit which transmits a post office box check request including the post office box ID to the information management server apparatus, which includes a unit which, when receiving the post office box check request, reads the child management ID associated with the post office box ID in the post office box check request, from the post office box management table, and transmits post office box confirmation information including at least the child management ID, to the information media controlling apparatus;

a unit which, when receiving the post office box confirmation information including the child management ID associated with the post office box ID in the post office box check request from the information management server apparatus by transmitting the post office box check request, transmits a replication acquisition request including a child management ID associated with a management file of a replication acquisition target from among child management IDs in the post office box confirmation information, to the information management server apparatus, which includes a unit which, when receiving the replication acquisition request, reads an entity ID associated with the child management ID in the replication acquisition request, from the system management table, reads an electronic data main body associated with the entity ID from the data original copy management table, generates a child management file including the child management ID and the electronic data main body, deletes the child management ID from the post office box management table, and transmits the child management file to the information media controlling apparatus; and a unit which, when receiving the child management file including the child management ID in the replication acquisition request from the information management server apparatus by transmitting the replication acquisition request, writes the child management file in the management file management table.

4. A program which is used in an information management server apparatus which includes a storage device and communicates individually with a plurality of information media controlling apparatuses, and which is stored in a non-transitory computer readable storage medium, the program comprising:

a first program code causing the information management server apparatus to execute processing of writing in the storage device a system management table in which at least one association between a management ID and an entity ID and at least one association between a child management ID and the management ID are written;

a second program code causing the information management server apparatus to execute processing of writing in the storage device a data original copy management table in which at least one entity ID and at least one electronic data main body are written;

a third program code causing the information management server apparatus to execute processing of writing in the storage device a post office box management table in which at least one association between a post office box ID and a child management ID is written;

a fourth program code causing the information management server apparatus to execute processing of, when receiving new registration request information including an electronic data main body of a management target from at least one of the plurality of information media controlling apparatuses, issues a management ID and an entity ID for the electronic data main body, based on the new registration request information, registers the management ID and the entity ID in association with each other in the system management table, and registers the entity ID and the electronic data main body in the data original copy management table;

a fifth program code causing the information management server apparatus to execute processing of, when receiving replication registration request information including a management ID associated with electronic data of a replication registration target and a post office box ID associated with an information media controlling apparatus of a replication acquisition destination, from at least one of the plurality of information media controlling apparatuses, issues a child management ID different from the management ID in the replication registration request information, associates the child management ID with the management ID in the replication registration request information, from among management IDs in the system management table and registers the issued child management ID in the system management table, associates the child management ID with the post office box ID in the replication registration request information to register the child management ID and the post office box ID in the post office box management table, and transmits replication registration processing result information including the child management ID to the at least one information media controlling apparatus that transmits the replication registration request information;

a sixth program code causing the information management server apparatus to execute processing of, when receiving a post office box check request including the post office box ID from at least one of the plurality of information media controlling apparatuses, reads the child management ID associated with the post office box ID in the post office box check request, from the post office box management table, and transmits post office box confirmation information including at least the child management ID, to the at least one information media controlling apparatus which transmits the post office box check request; and a seventh program code causing the information management server apparatus to execute processing of, when receiving a replication acquisition request including a child management ID associated with a management file of a replication acquisition target from among child management IDs in the post office box confirmation information, from at least one of the plurality of information media controlling apparatuses, reads an entity ID associated with the child management ID in the replication acquisition request, from the system management table, reads an electronic data main body associated with the entity ID from the data original copy management table, generates a child management file including the child management ID and the electronic data main body, deletes the child management ID from the post office box management table, and transmits the child management file to the at least one information media controlling apparatus which transmits the replication acquisition request.

5. A program which is used in an information media controlling apparatus which communicates with an information management server apparatus and includes a storage device, and which is stored in a non-transitory computer readable storage medium, the program comprising:

a first program code causing the information media controlling apparatus to execute processing of writing in the storage device a management file management table in which a child management file including a management ID and an electronic data main body is written;

a second program code causing the information media controlling apparatus to execute processing of transmitting new registration request information including an electronic data main body of a management target, to the information management server apparatus which, when receiving the new registration request information, issues a management ID and an entity ID for the electronic data main body, based on the new registration request information, registers the management ID and the entity ID, in association with each other, in a system management table stored in a system management table storing unit, and registers the entity ID and the electronic data main body in a data original copy management table stored in a data original copy management table storing unit;

a third program code causing the information media controlling apparatus to execute processing of transmitting replication registration request information including a management ID associated with electronic data of a replication registration target and a post office box ID associated with an information media controlling apparatus of a replication acquisition destination, to the information management server apparatus which, when the receiving replication registration request information, issues a child management ID different from the management ID in the replication registration request information, associates the child management ID with the management ID in the replication registration request information, from among management IDs written in the system management table and registers the issued child management ID in the system management table, associates the child management ID with the post office box ID in the replication registration request information to register the child management ID and the post office box ID in a post office box management table stored in a post office box management table storing unit, and transmits replication registration processing result information including the child management ID to the information media controlling apparatus;

a fourth program code causing the information media controlling apparatus to execute processing of transmitting a post office box check request including the post office box ID to the information management server apparatus which, when receiving the post office box check request, reads the child management ID associated with the post office box ID in the post office box check request, from the post office box management table, and transmits post office box confirmation information including at least the child management ID, to the information media controlling apparatus;

a fifth program code causing the information media controlling apparatus to execute processing of, when receiving the post office box confirmation information including the child management ID associated with the post office box ID in the post office box check request from the information management server apparatus by transmitting the post office box check request, transmits a replication acquisition request including a child management ID associated with a management file of a replication acquisition target from among child management IDs in the post office box confirmation information, to the information management server apparatus which, when receiving the replication acquisition request, reads an entity ID associated with the child management ID in the replication acquisition request, from the system management table, reads an electronic data main body associated with the entity ID from the data original copy management table, generates a child management file including the child management ID and the electronic data main body, deletes the child management ID from the post office box management table, and transmits the child management file to the information media controlling apparatus; and a six program code causing the information media controlling apparatus to execute processing of, when receiving the child management file including the child management ID in the replication acquisition request from the information management server apparatus by transmitting the replication acquisition request, writes the child management file in the management file management table.

* * * * *